(12) United States Patent
Hanson

(10) Patent No.: US 8,666,924 B2
(45) Date of Patent: *Mar. 4, 2014

(54) MESSAGE CONDUIT SYSTEMS WITH ALGORITHMIC DATA STREAM CONTROL AND METHODS FOR PROCESSING THEREOF

(76) Inventor: Trevor Hanson, Sequim, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/566,863

(22) Filed: Aug. 3, 2012

(65) Prior Publication Data

US 2013/0046722 A1 Feb. 21, 2013

Related U.S. Application Data

(63) Continuation of application No. 12/421,551, filed on Apr. 9, 2009, now Pat. No. 8,239,340.

(60) Provisional application No. 61/044,366, filed on Apr. 11, 2008.

(51) Int. Cl.
*G06F 17/00* (2006.01)
*G06N 5/02* (2006.01)

(52) U.S. Cl.
USPC ............................................................ 706/47

(58) Field of Classification Search
None
See application file for complete search history.

(56) References Cited

U.S. PATENT DOCUMENTS 8,239,340 B2 * 8/2012 Hanson .......................... 706/47

* cited by examiner

*Primary Examiner* — Michael B Holmes
(74) *Attorney, Agent, or Firm* — Plager Schack LLP

(57) ABSTRACT

A method for processing messages is provided where at least one algorithmic conduit is defined, and at least one conduit rule for controlling at least one algorithmic conduit is defined. An algorithmic conduit is a persistent connection, controlled by explicit, independent, dynamic rules, and capable of processing messages among data communicators such as devices, systems, or programs. Messages can be monitored, filtered, transformed, correlated, or processed in other ways without modifying the data communicators. A message conduit hub system allows creation and management of algorithmic conduits to serve as active, virtualized links carrying rules-based data streams among configurable endpoints. These "smart" connections are managed using parameters, logic, and other control interfaces for tailoring behavior to a particular application, site, or user. A message conduit hub system may be implemented as a stand-alone device, as part of a larger system, or as an "encapsulation layer" for an existing application.

24 Claims, 19 Drawing Sheets

```
1902 ──── # MCH1 conduit configuration
1904 ────── identification:
         ── serial: 0123456-789
              ip: //192.168.1.251
1906 ──────── version: p2.1-1955-2
1908 ──────── connections:
              ── usb:
   1910 ──────── 101: scanner
                 102: printer
      1912 ──── ethernet:
   1916 ──────── 201: { alias: POS, connection('//192.168.1.201') }
                 202: { alias: siteHost, connection('//192.168.1.254') }
      1918 ────  203: { alias: dataCenter, connection('//10.0.14.156') }
                 204: { alias: networkProcessor, connection('//10.0.15.2') }
1920 ──────────  998: { alias: controlPanel, connection('//localhost:1234') }
                 999: { alias: controlPanel, connection('//localhost:1235') }
1922 ────────── applications:
              ── a1($QS):     { alias: networkTrans: cmd: '/usr/lib/nettrans $QS' }
1924 ────────── a2($QS):      { alias: reformatReceipt: cmd: '/usr/lib/receipt $QS' }
                a3($QS):      { alias: transErr: cmd: '/usr/lib/transerror $QS' }
1926 ────────── a4($QS,$1):   { alias: transTest: cmd: '/usr/lib/transtest $QS $1' }
1928 ────────── state:
              ── s1:          { alias: transArray[], type: string }
1932 ────────── s2:           { alias: transCount, type: integer }
              ── conduits:
1934 ────────── A:
   1936 ──────── from:    scanner                                           ─────1942
             ─── to:      POS                                        ───────────1944
   1938 ──── action: ──────────────────────────────────────────────────────
                divert: ─────────────────────────────────────────────────1946
                   to: networkProcessor ─────────────────────────────1948
                   filter: /^(123456.*)$/ ─────────────────────────────
                   send: /\1/ ──────────────────────────────────1952
1960 ──────── pass:     { filter: /^(.*)$/, send: /\1/ } ──── 1954
           ── B:
   1962 ──── from:    networkProcessor
         ─── to:      networkTrans
   1964 ──── action:
   1966 ──────── pass:     { filter: /^(.*)$/, send: /\1/ }
             ── C:
1970 ──────── from:    networkTrans
              to:      POS
              action:
                divert:   { to: transErr, filter: /^ERR (.*)$/, send: /1234:\1/ }
1972 ──────── save:
                filter: /^OK (.*)$/
   1974 ─────────── write:   transArray[++transCount]=/\1/
                pass:     { filter: /^OK (.*)$/, send: /\1/ }
           ── D:
1976 ──── from:    POS
              to:      printer
              action:
                divert:
                   to: reformatReceipt
                   filter: /^(.*)$/
1980 ─────────── test:    transTest(/^.*$/,transArray[transCount])
   1982 ─────── onTrue: --transCount
                pass:     { filter: /^OK (.*)$/, send: /\1/ }
1984 ──── E:
              from:    reformatReceipt
              to:      printer
              action:
                pass:     { filter: /^(.*)$/, send: /\1/ }
         # end
```

FIG. 19

```
        ; list sorted lines containing a string
        ; (creates list of all lines in foo.txt containing 'BAR')
2002 ── cat foo.txt | grep 'BAR' | sort >result.txt
               ⟍2004  ⟍2006    ⟍2008
```

FIG. 20A

```
2022 ⟋
      ⟋─ main(ac,av) {
 2032 ──── FILE fin  = fopen("foo.txt","r");
 2034 ──── FILE fout = fopen("result.txt","w");
           char *bigbuf, **sortstack, **stacktop;
           // ... initialization, omitted
           while (fgets(bigbuf,500,fin) {
 2036 ────── if (strpos(bigbuf,"BAR") >= 0) {
                *(sortstack++) = bigbuf;
                bigbuf += strlen(bigbuf)-1;
                *(bigbuf++) = 0;
             }
           if (sortstack > stacktop) {
              qsort(stacktop, sortstacktop-sortstack, sizeof(char *), strcmp);
 2038 ────── while (stacktop < sortstack) fprintf(fout,"%s\n",stacktop++);
           }
        }
```

FIG. 20B

MESSAGE CONDUIT SYSTEMS WITH ALGORITHMIC DATA STREAM CONTROL AND METHODS FOR PROCESSING THEREOF

RELATED APPLICATION

This is a continuation of U.S. patent application Ser. No. 12/421,551, filed on Apr. 9, 2009 titled "MESSAGE CONDUIT SYSTEMS WITH ALGORITHMIC DATA STREAM CONTROL AND METHODS FOR PROCESSING THEREOF" which claims the benefit of priority under 35 U.S.C. §119(e) of U.S. Provisional Application No. 61/044,366, filed on Apr. 11, 2008, and entitled "MULTI DATA STREAM HUB SYSTEM AND METHOD," the entirety of which are hereby incorporated herein by reference to be considered a part of this specification.

BACKGROUND OF THE INVENTION

1. Field of the Invention

The present invention relates generally to digital computer input/output data transfer and transformation, and more specifically to algorithmic control of data streams.

2. Description of the Related Art

Numerous existing hardware and software technologies are used to interconnect computer systems, peripheral devices, software programs, and other elements. These technologies are stratified, from low-level hardware connections to high-level message and software protocols. FIGS. 1-5 illustrate existing connection technology, to clarify terminology and to set context.

Referring to FIG. 1, a desktop computer 102 illustrates typical connections 114 that link it to external devices 122 (such as monitors, keyboards, printers, and scanners) and to other computers 132 (such as web servers and file servers). The computers 102 and 132 are used to run programs 142 and 152 that utilize the connections 114 to communicate with each other and with the devices 122. Software-to-device communication is supported by messaging interfaces 162 that may be implemented in hardware, firmware, or software.

Computer connections 114 are most often considered in terms of their physical components (cables, connectors, etc.), but they also involve other stratified elements, all working together to connect programs 142 with remote resources 122 and 132. Proceeding to FIG. 2, a scanner 202, printer 204, and two computers 102 and 132 are linked with what appear to be three simple physical connections 114, 214, and 216. Data 210 travels from scanner 202 to computer 102 (after transitioning intermediate devices such as routers 232 and hubs 236), where it is received by a software application 242. The software 242 sends different data to a program 252 on the second computer 132, which in turn sends other different data through a connection 216 to a printer 204, where output 262 is produced (in this example, a French translation of an English expression scanned as input).

An untrained observer might conclude that data 210 simply travels through the wires and devices, to emerge 262 from the printer 204 like water through a hose, or like electricity flowing to a light fixture. However, in modern data communications, structured protocols have replaced simple on/off settings and analog signals. Thus, layered connections link the programs 242 and 252 with each other and with remote devices 202 and 204.

Proceeding to FIG. 3, two connections are shown in greater detail. In the center are the lower-level or physical connections 214 and 216, which move messages between computers 102 and 132 and the printer 204. These connections might transition through a "cloud" of diverse lower-level devices and connection technologies 316; examples include routers, modems, hubs, "wedge" interfaces, and cables, as well as the standards and protocols they utilize, such as Ethernet, USB, RS-232, and IEEE 1394. These lower-level connections may incorporate hardware, firmware, drivers, or software components, providing transparent links or "tunnels" from end-to-end. The choice or configuration of such network elements can often be modified without affecting their external users. In the present invention, when we refer to lower-level or physical connection technologies, we mean this very broad range of device-to-device linkages.

The programs 242 and 252 also utilize higher-level or virtual connections 322 and 324 to exchange messages. These messages relate to but are different from the lower-level messages of physical connections 214 and 216, and typically are embedded within those lower-level messages. They conform to structured messaging interfaces 344, 354, and 364, which are built into the programs 242 and 252 and the printer 204, respectively. Messaging interfaces define rules for conversations between endpoints; they also provide virtual access 374, 376, and 378 to system software, firmware, and hardware. Such interfaces are usually hierarchical and interrelated, with a given program using many such interfaces in a single connection. Examples of higher level connection strategies include use of common technologies (such as Named Pipes, Sockets, virtual devices, virtual circuits, "Hartmann Pipelines," and RPC), use of standards and protocols (such as HTTP, SOAP, XML, YAML, the TCP/IP protocol stack, and the OSI seven-layer protocol stack), and use of interface paradigms intrinsic to specific development tools or frameworks (such as AJAX, C++, PHP, Python Pipelines, UML Statecharts, Prograph, Smailtalk, and Microsoft .NET). In the present invention, when we refer to higher-level or virtual connection technologies, we mean this very broad range of software-oriented linkages. The choice of levels, layers, protocols, standards, etc., are implementation decisions; different practitioners might make different choices for a given application. Moreover, there is no strict dividing line between higher-level and lower-level protocols. In general, the behavior of all such connections is determined by their messaging interfaces 344, 354, and 364, which in turn are controlled through software 242 and 252. Programs 242 and 252 thus utilize both lower-level connectivity 214, 216, and 316 and higher-level connectivity 322, 324, 344, 354, and 364.

Proceeding to FIG. 4, the stratified elements of FIG. 3 deliver messages at several levels, using various technologies, by which for example the print program 252 can utilize a physical connection 216 to output text on the printer 204. The two endpoints 252 and 216 participate in a structured conversation implemented in source logic 402 and destination logic 404, where software and firmware implement shared messaging interfaces. The program 252 thus utilizes system services 412 (including firmware and hardware components on the computer 132) to send messages via the physical connections 216 to the printer's firmware 414. These messages have layered content, with formats dictated by the messaging interfaces, and which contain such elements as network data 424 (for addressing, etc.), printer control 426 (for page layout, etc.), and the text to be printed 428. Each message usually has a specific recipient—in this example, either a messaging interface within the printer firmware 414 or one of the other infrastructure components (such as a network card). All these messages and components work together to create the simplistic illusion of text flowing down the wire, appearing as ink at the print-head.

As described above, FIGS. 1-4 illustrate typical data communications strategies. A common feature of connectivity applications, and indeed of most computer applications, is the need for continuous improvement. In engineering, this is an unusual need. A dam, building, or vehicle may never need alteration, if designed and built properly; but computer systems are expected to evolve, in step with environment changes and technology advances. However, this computer system evolution is constrained by the high cost of creating and changing software.

Many techniques have been developed for improving software productivity, such as operating systems, higher-level languages, structured methods, databases, automated testing, and object-oriented systems, as well as advances in communications technology such as interface standards, protocol stacks, automatic error correction, and diagnostic tools. These have all helped. Nevertheless, data communications applications remain complex and costly to change, and have distinctive challenging problems that are well-known to practitioners.

Today, software modification is complicated by the available data communication strategies, which generally focus on moving intact messages between endpoints, subject to messaging interfaces and protocols dictated by those endpoints. FIGS. 5A-5D illustrate this problem, by considering how to enhance an existing connectivity application, using the pair of example programs 242 and 252 from FIGS. 2-4, which process and print scanned input. Suppose it is desired to change these programs, for example to support a new model of scanner having a different data format, or to monitor scanned input for a list of keywords. Proceeding to FIG. 5A, a common modification technique is shown, where changes are made to one or both programs 502 and/or 504. The changed programs must conform both to the existing physical connectivity (via the link 214) and logical connectivity (via the links 322, 344, and 354). Logic changes 506 and 508 might also alter the messaging interfaces 512, 514, and 516. Software changes of this nature are well understood in the art, but the conventional programming used often involves significant effort and cost.

Proceeding to FIG. 5B, another modification technique is shown, where a new program 522 is added, rather than modifying the existing programs 502 and 504. This approach might implement the same functionality changes (in this example, adding a new scanner model or monitoring for keywords) without altering the existing components, perhaps because they are not easily modified, because they use dissimilar technology, or because integrating the new logic would be difficult. The new program 522 would be inserted between the two communication endpoints 242 and 252, using program logic 524 that conforms to the existing messaging interfaces 526 and 528, and that is hosted on some platform 532, such as a new computer system connected via extensions of existing physical 214 and 534 and logical 322 and 536 connectivity. This configuration is recognized as a "three-tier architecture" (i.e., three cooperating programs that all operate independently), which is a well-known but complex communications system design. This technique is sometimes employed in middleware layers of large enterprise systems, in "server farms," and in other sophisticated applications, and usually involves high costs due to development, testing, error recovery, deployment, management, and other challenges.

The two approaches shown in FIGS. 5A and 5B each use standard software development methods, which historically and by definition focus on the creation of programs and their external interfaces. Specific implementation choices would normally be dictated by the programming methods chosen, which each treat connectivity in different ways, e.g. via simplifying models (as in stream-oriented systems), via built-in constructs (as in message-oriented systems) or via standard protocols and messaging interfaces (as in most communication systems). Regardless of method, the building or modifying of necessary software would involve significant effort, costs, and risks, particularly when the existing systems are complex.

Proceeding to FIG. 5C, the elements of FIGS. 5A and 5B are presented in a different way, to illustrate at least one problem to be solved: how to modify the behavior of a communications application without either modifying or adding programs. One desired solution would be to avoid programming by instead reconfiguring the connection 542. If the parameters of the existing connection 322 could be changed (for example, so that the connection 322 automatically translated a new scanner format, or monitored data for keywords), then the desired behavior changes could be achieved, while preserving the existing two-tier application. Unfortunately, today's connectivity tools divide responsibility unfairly between programs and connections. All application knowledge resides in the programs, whereas connections move messages between endpoints. This is because today's connectivity tools use a program-centric model.

Proceeding to FIG. 5D, current software development is constrained by its focus on "islands" of computation, which communicate through mechanisms intrinsic to each "island." Thus, the two programs 242 and 252 exchange messages 322 according to their built-in messaging interfaces. If the application uses a third program 562, this is done via an independent connection 564, with only Program B 252 being aware of both connections 322 and 564. Changing any interface requires changing the associated programs. But what if these programs 242, 252, and 562 communicated through active pathways 572 and 574, capable of filtering, transforming, or redirecting their content? What if the behavior of such pathways could be altered at will, without changing the programs, e.g. to correlate their content or to divert data to other systems? Today, the only option for making such application changes would be to modify the programs, such as shown in FIG. 5A, or to break the connections and insert new programs, such as shown in FIG. 5B. No mechanism exists for creating "smart" connections, such as shown in FIGS. 5C and 5D.

SUMMARY OF THE INVENTION

The present invention provides embodiments and methods that offer cost-effective solutions to problems inherent in existing connectivity models, by implementing algorithmic conduits to transfer and process messages. An algorithmic conduit is a persistent message pathway linking data communicators, such as devices, systems, or programs, with explicit, independent rules that control its configuration and operation. Its behavior may be changed dynamically, without altering the endpoints, through conduit rules that may support monitoring, filtering, transforming, optimizing, validating, correlating, and other processing of messages.

In one embodiment of this communication methodology, an inventive message conduit hub system is provided that supports the creation and management of algorithmic conduits. The hub provides virtualized links among data communicators, such as scanners, printers, computer systems, or software applications. It reduces the complexity and cost of building or modifying data stream applications by providing a structured framework for algorithmic conduits that actively manage data streams. This approach avoids the need to create comparable logic with traditional programming, instead using "smart" linkages that may be managed using parameters, tables, and similar control interfaces, via such properties as data sources and destinations, pattern-matching filters, data replacements, and logic tailored for a particular application, site, or user.

In another embodiment, an inventive message conduit hub system is implemented on a stand-alone computer appliance, for installation between a computer system and its connected devices, analogous to the connection of a network router, switch, firewall, or hub. A user could interpose such a system between existing physical communication endpoints, such as between a computer and its scanners or printers, to gain control over their message traffic.

In yet another embodiment, a message conduit hub system is provided as a set of software programs installed on a general-purpose computer platform, such as a web server or desktop workstation. The system could control traffic that originates from, ends on, or transitions that platform. This configuration is analogous to the connection of a software firewall, antivirus tool, or gateway. A user could interpose such a system between existing virtual communication endpoints, such as browsers, web addresses, named pipes, communication ports, or virtualized resources, to gain control over their message traffic.

In each of these example embodiments, users could define and manage "smart" linkages via suitable control interfaces. Those control interfaces could resemble analogous features of a router or firewall (such as via web pages, control tables, or add-in programs), but they would manage conduit rules comprising parameters appropriate for algorithmic conduits. Such control interfaces would typically be geared for a particular class of application (e.g. retail store connectivity or web server access), and could address such properties as data sources and destinations, pattern-matching and other filters, data replacements and other transformations, use of standard built-in logic pertaining to specific applications (e.g. barcode processing, web access, or database transactions), and custom application-, site-, or user-specific logic.

These embodiments could be particularly useful when changing or interfacing to existing computer applications. For example, whether implemented as a stand-alone device or as part of a larger system, an embodiment could treat a legacy application as a "black box," i.e., strictly in terms of its inputs and outputs, taking actions based on external data traffic. This technique could avoid the need to modify or understand a legacy application's internals, via an active "encapsulation layer" for the application's external behavior, thereby making it easier to implement enhancements (such as new reports, external transactions, data redirection, or reformatting).

The present invention may appear similar to a programmable router, but the following analogies contrast these two technologies. By analogy, a router functions like a post office, choosing how to send each envelope to the correct destination, based on an address, return address, and stamp type. In other words, a router delivers individual messages based on their addresses. By analogy, the present invention lets a user create a grid of pneumatic tubes for moving many messages among senders and recipients, using dynamic rules to control the operation of each tube (such as inspecting, modifying, or remembering the contents of each envelope within the tube). In other words, an algorithmic conduit animates a particular message pipeline, and a message conduit hub manages many such pipelines.

In traditional computing, "smart" programs communicate through "dumb" connections. Connectivity advances have focused on making programs "smarter" about communications, and on making it easier to design and build programs. Algorithmic conduits take a different tack. They create "smart" connections, doing work that otherwise would be implemented in the endpoint software. Algorithmic conduits are a new "design pattern" for connectivity applications, using parameter-driven active linkage as an alternative to program-controlled passive linkage. This improvement is intended to provide significant savings in implementation and maintenance costs, to provide new design choices, and to enable new functionality that is not practical today.

BRIEF DESCRIPTION OF THE DRAWINGS

FIG. 19 is an exemplary control table, suitable for the embodiment in FIG. 9A, specifying the active algorithmic conduit configuration using a conduit rules syntax.

FIG. 20A shows how a command or shell script might perform processing that utilizes implicit conduits.

FIG. 20B shows how a software program might perform processing that utilizes implicit conduits.

DETAILED DESCRIPTION OF EMBODIMENTS

Figure 6A:
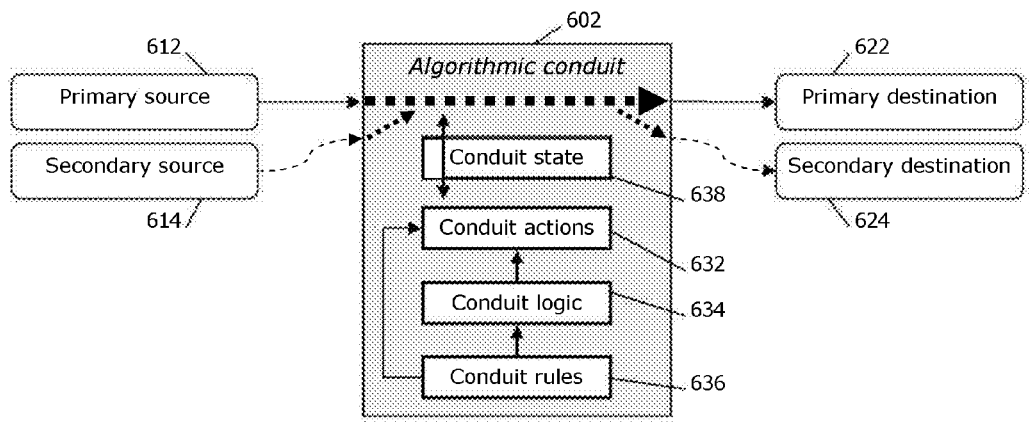
FIG. 6A shows the elements of an algorithmic conduit.
Figure 6B:
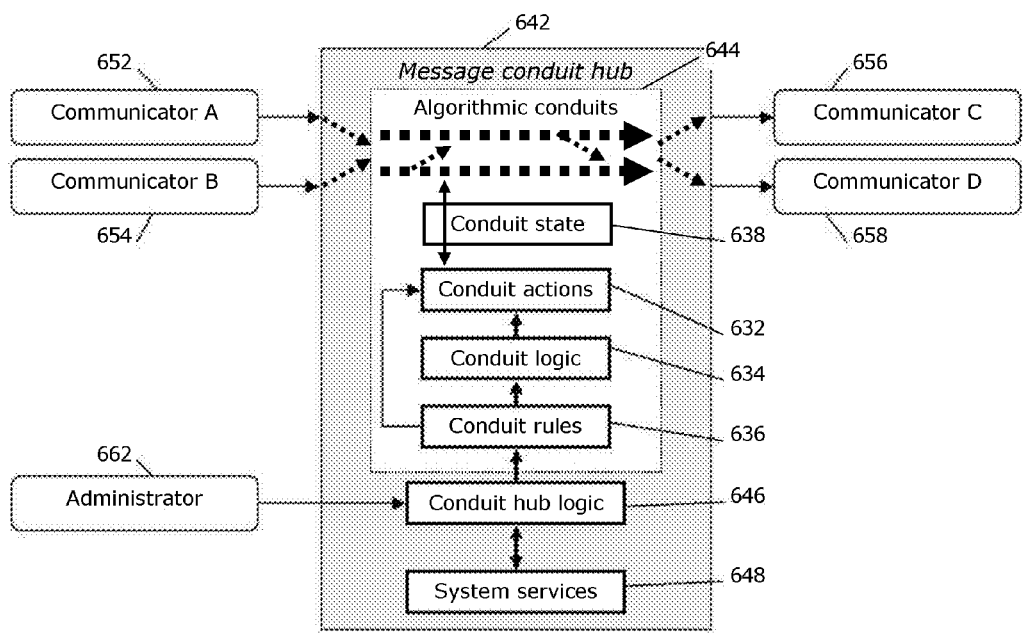
FIG. 6B shows how algorithmic conduits are implemented in an inventive message conduit hub system.
Figure 7:
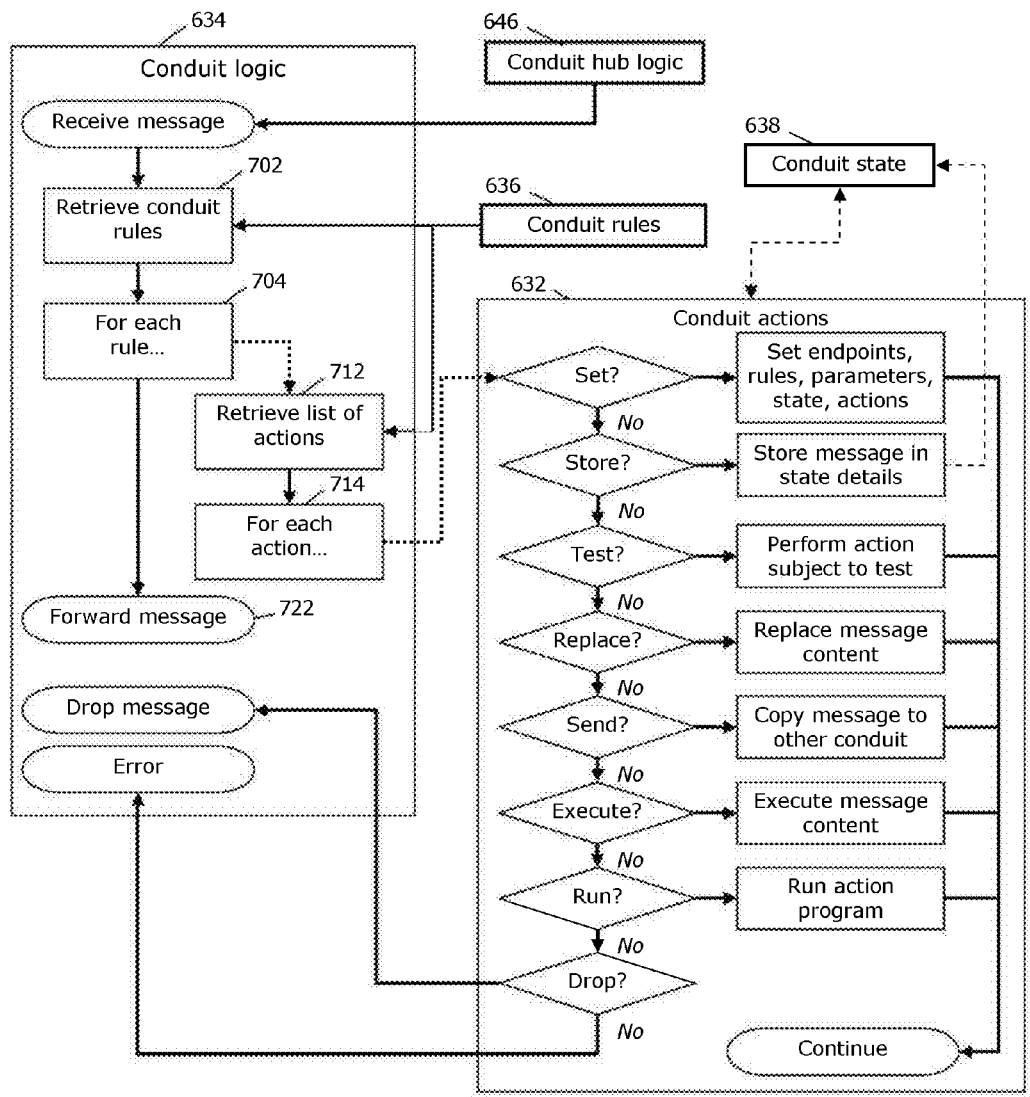
FIG. 7 shows a flowchart summarizing processing in an inventive message conduit hub system.

Certain embodiments of the present invention are described below, with reference to FIGS. 6A through 18B. FIG. 6A illustrates an example of a single algorithmic conduit. FIGS. 6B and 7 illustrate how one or more such algorithmic conduits may be supported by one embodiment of an inventive message conduit hub system. FIGS. 8A through 12C illustrate two representative data communication applications that exemplify embodiments and applications of the present invention, and in which utilization of the invention can save effort, reduce cost, and improve functionality. Specifically, FIGS. 8A through 10B illustrate a retail sales system and the implementation of one embodiment of the invention thereto, while FIGS. 11A through 12C show a web-based application and, similarly, the incorporation of an embodiment of the invention thereto. FIGS. 13 through 18B describe implementation of specific embodiments in greater detail.

TERMINOLOGY

In describing the present invention, the following terms refer to general industry concepts having the associated meanings:

"data communicator" comprises a device, system, program, conduit, or other physical or virtualized element that sends and/or receives messages;

"conduit" (also "connection") comprises a link that transfers messages among data communicators;

"data stream" comprises a collection of messages traveling along the same conduit;

"endpoint" comprises a data communicator at one end of a conduit;

"message" comprises a block of data communicator input or output, treated as a unit (regardless of its internal structure or processing complexity); and "messaging interface" comprises the collection of protocols, standards, methods, and equipment which allow a data communicator to send a message.

The following terms reflect embodiments of the present invention or their components and have the following meanings:

"algorithmic conduit" comprises a form of conduit that is controlled by conduit rules;

"message conduit hub" (also "conduit hub") comprises an inventive device or system that is configured to implement algorithmic conduits;

"conduit communicator" comprises a data communicator linked to or located within an inventive message conduit hub;

"conduit rule" comprises an explicit, persistent definition of how a conduit entity is defined, configured, or operated;

"conduit entity" comprises an algorithmic conduit, conduit rule, conduit action, or conduit communicator;

"conduit action" comprises an operation that may be performed when applying a conduit rule to a message, message content, or a conduit entity, either conditionally or unconditionally, and that may involve such operations as, for example, connecting, disconnecting, diverting, duplicating, routing, storing, transferring, filtering, testing, validating, translating, transforming, correlating, monitoring, analyzing, optimizing, summarizing, merging, dividing, projecting, parsing, compiling, interpreting, executing, pickling, identifying, serializing, timestamping, binding, marshalling, or encrypting its target;

"conduit state" comprises a set of data values associated with algorithmic conduit processing, providing persistent access to message and other data.

General Concepts

Proceeding to FIG. 6A, an algorithmic conduit 602 is illustrated connecting a primary source 612 with a primary destination 622, such as an external device or other conduit communicator. Optionally, secondary sources 614 and secondary destinations 624 may also be present. When a message arrives from one of the sources 612 and 614, processing occurs to select conduit actions 632 under the control of conduit logic 634, as specified in the conduit rules 636. Conduit actions and conduit rules comprise such operations as selecting data sources and testing or replacing message content; these operations are discussed below in reference to FIG. 7. During processing, conduit actions 632 may comprise the inspection or modification of either the conduit state 638, the message, its content, the selection of sources 612 and 614, or the transfer of the message to one or more destinations 622 or 624. An algorithmic conduit 602 thus comprises a stateful, rules-based pipeline for moving messages among endpoints 612, 614, 622 and 624.

Proceeding to FIG. 6B, an inventive message conduit hub system 642 may be configured to support multiple algorithmic conduits 644, any or all of which may share the same set of conduit actions 632, conduit logic 634, conduit rules 636, and conduit state 638. This example system adds conduit hub logic 646, which supports creation, management, and use of algorithmic conduits 644. It may use system services 648 (such as an operating system) to interact with physical devices, and to perform the other operations needed to link conduit communicators 652, 654, 656, and 658 with the algorithmic conduits. An administrator 662 could interact with the conduit hub logic 646 to manage the system, such as for adding or changing conduit rules 636. A message conduit hub system 642 thus implements multiple algorithmic conduits 644 using a common operation and management infrastructure 646 and 648.

Proceeding to FIG. 7, a simplified flowchart is shown that illustrates how the elements of FIGS. 6A and 6B might implement algorithmic conduits. In this embodiment, conduit hub logic 646 invokes conduit logic 634 as each message is received from a conduit communicator. The conduit logic 634 retrieves the conduit rules 702 and 636 associated with the active conduit. Then, for each conduit rule 704, it retrieves the list of conduit actions 712. Conduit actions might be represented or implemented in various different ways, such as table references, program calls, program or script source code, or via a meta-language (such as YAML or XML). Operation might occur serially or in parallel (such as with a language like Erlang). Depending on the implementation, each action is performed 632 in the appropriate way. FIG. 7 shows a simple approach based on a series of yes/no decisions involving typical algorithmic conduit actions (such as, for example, setting parameters, storing values in conduit state 638, dropping a message, or running an application program). After all actions 714 and rules 704 associated with a particular message have been processed, the conduit logic normally forwards the message to the destination 722, unless a different action was specified. Conduit logic 634 thus processes messages as they traverse algorithmic conduits, by processing one or more conduit actions 632 encoded in one or more conduit rules 636.

Lower-Level Connectivity Embodiments

Figure 1:
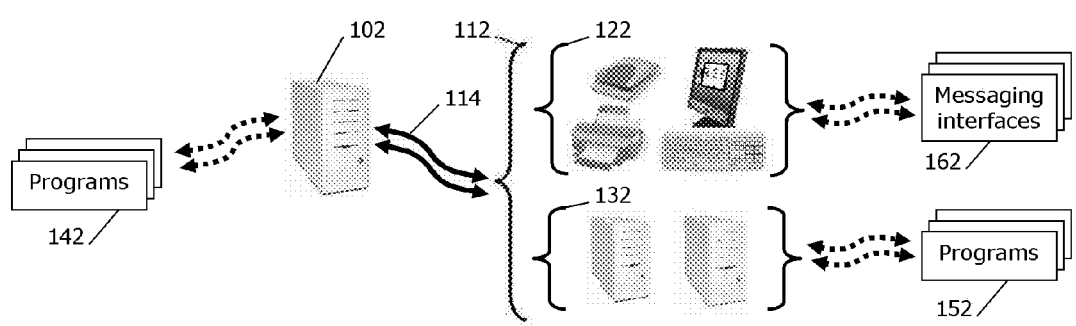
FIG. 1 shows how computers are connected to various devices.
Figure 2:
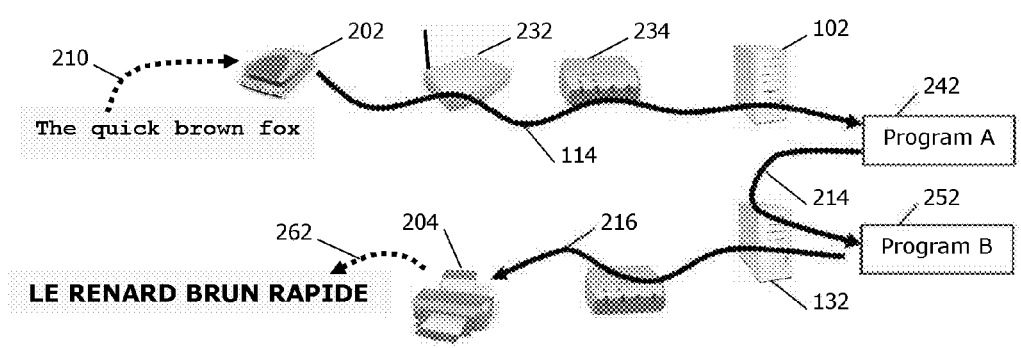
FIG. 2 shows how the connections between pairs of devices might span many intermediate devices and utilize many technologies.
Figure 3:
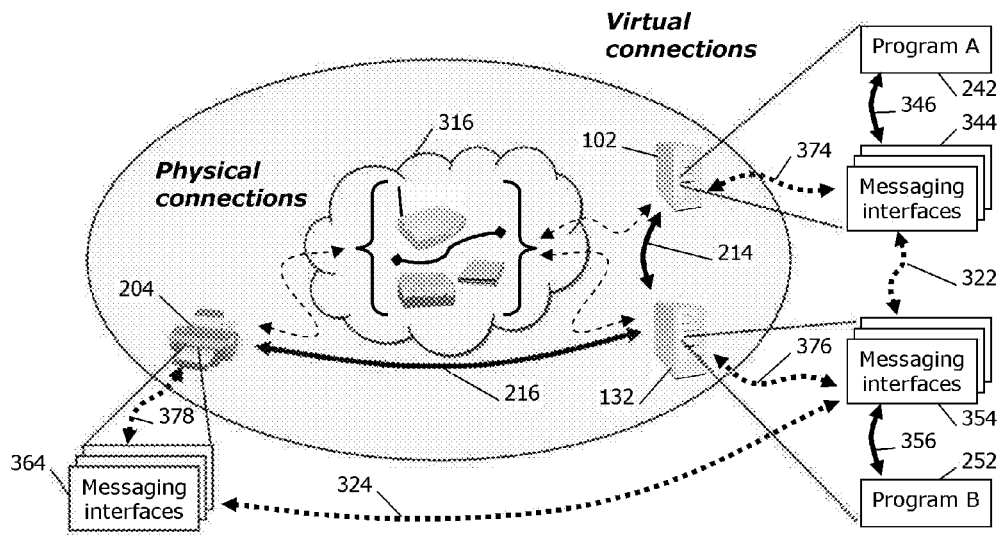
FIG. 3 shows how connectivity is stratified between lower-level physical connections and higher-level virtual connections.
Figure 4:
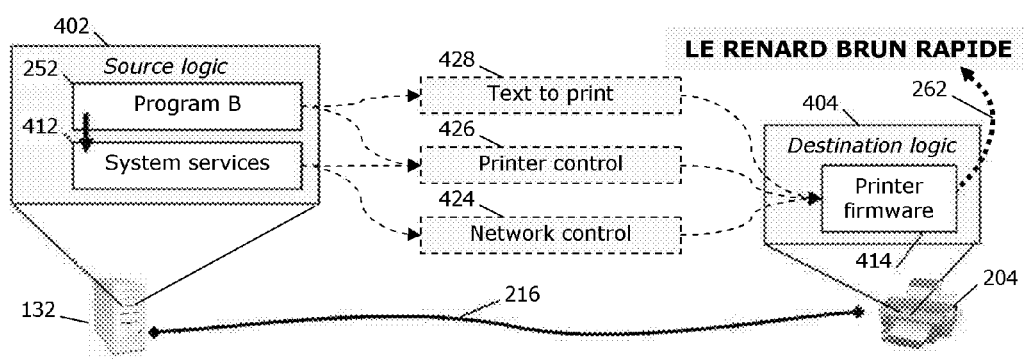
FIG. 4 shows how a particular connection, such as between a computer and a printer, might utilize many devices, programs, standards, and protocols.
Figure 8A:
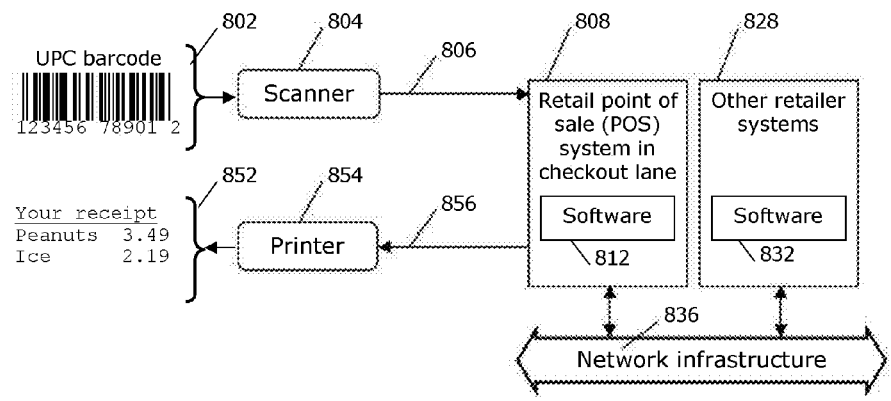
FIG. 8A shows how a scanner, printer, and point of sale (POS) system are utilized to process retail sales.

Proceeding to FIG. 8A, one embodiment of the present invention can be described in the particular context of the sale of items at a typical supermarket or other retailer, where processing is controlled by barcode scans, and where we can assume common connectivity methods are employed. A product or packaging bearing a barcode 802 can be read by a scanner 804, where information can be transmitted via some connection technology 806 (which might be hard-wired or wireless) to a retail point of sale (POS) system 808 serving the checkout lane. Software 812 on the POS system receives messages from the scanner 804 via the connection 806. The POS 808, like others at the retail location, is connected to other retail systems 828 (such as a site host for the store, or servers in one or more data centers). Those systems contain their own software systems 832 that interoperate with the POS software 812 and with each other, supporting the POS functions and also performing such operations as daily roll-up of transactions to regional or national back-ends, reporting, cash reconciliation, auditing, and accounting. A network infrastructure 836 provides connectivity, allowing the POS software 812 to exchange messages with the other systems 832 (such as for using barcode data 802 to look up prices and other details from an item database). Processing could also include other familiar elements, not shown (such as a cash drawer, scale, keyboard entry, payment tender, and coupon processing). Eventually, the POS software 812 creates a receipt 852 by sending text a printer 854 via a physical connection 856. Details of all the processing elements vary among retailers, and also among POS system vendors; many such systems have more or fewer elements. UPC item processing of this nature is widely used and understood. The system of FIG. 8A thus comprises three sets of physical connections 806, 836, and 856, which might use either separate cables linking pairs of devices (e.g. 804 to 808, 808 to 812, and 808 to 836 as shown), a single wired or wireless network infrastructure (836 shared by all devices 804, 808, 828, and 854, not shown), or other topologies, and which use various standards or technologies (such as USB, Ethernet, RS-232, etc.). Such choices are not critical to the present invention. Regardless of physical configuration, virtual connections (as described above with FIG. 3) link the POS software 812 to the scanner 804, to the printer 854, and to server software 832.

Figure 8B:
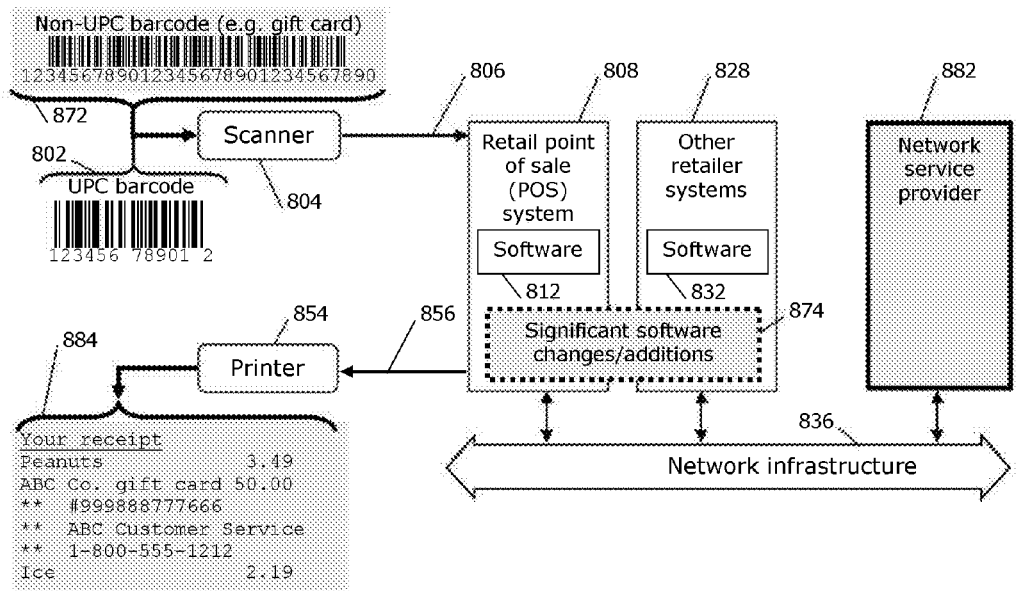
FIG. 8B shows that enhancing the example of FIG. 8A by supporting a new barcode type could require major software changes.

Proceeding to FIG. 8B, the system of FIG. 8A might be modified to process a new type of barcode not supported by the existing system. Many retailers have faced this problem in recent years, when they attempted, for example, to add gift cards, coupons, and other new barcodes that didn't follow the UPC barcode 802 standard. FIG. 8B illustrates an example 30-digit Code 128 barcode 872 that might be used on a gift card.

The scanner 804, like most retail scanners, can be reconfigured to read the new barcode and need not be replaced. However, because the existing point of sale (POS) software 812 only recognizes twelve-digit UPC item numbers, it would reject the new longer scans. Retailers wanting to add such capabilities had to change their systems, requiring a significant investment in new software 874. Changes have involved such processing as a) recognizing the new non-UPC scans, b) verifying them using means specified by a network service 882, c) performing additional steps (such as prompting the cashier for a dollar amount), d) sending the transactions to the network service 882, e) obtaining confirmation data from the network service provider 882 (such as transaction IDs), f) creating receipts 884 (or separate chits) using a new format that contains the necessary details, and/or g) interfacing with existing applications 812 and 832 to support the current retail processing, accounting, reconciliation, etc.

Because retail computer systems are often large and complex, and span many platforms, a modification of this scale might require many person-years of design, programming, testing, documentation, release management, etc., all involving costs, delays, and risks. The approach of FIG. 8B thus involves commercial trade-offs, and might be avoided unless such enhancements offer significant benefits. Historically, although some retailers and POS vendors have chosen to invest in such modifications, the daunting scale of modifying legacy systems has been a barrier to the introduction of gift cards at retail, as it has been a barrier for adding many other features, products, and services. Most industries face similar challenges.

Figure 9A:
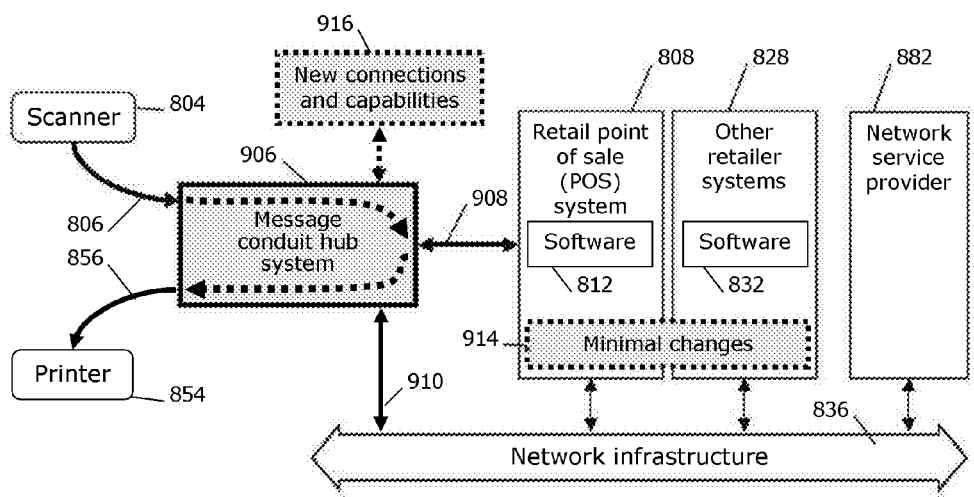
FIG. 9A shows how an embodiment of the present invention can reduce the software changes otherwise required in FIG. 8B.

Proceeding to FIG. 9A, an embodiment of the present invention could be used to reduce the cost, effort, and complexity of implementing the functionality of FIG. 8B relative to the system of FIG. 8A. An inventive message conduit hub device 906 is shown to be inserted between the existing point of sale (POS) system 808 and its scanner 804 and its printer 854, and connected to the existing devices 806, 856, 908, and 910 and network infrastructure 836. This approach avoids most if not all software changes 914, which necessarily changes the economics of the gift card implementation decision. It also provide the opportunity for additional connections and capabilities 916 without the need for software changes, enabling other retail improvements beyond just gift cards. For example, the conduit hub 906 could be configured to send duplicate or filtered data streams to other retail systems 828 for sales tracking or analysis.

To deliver these benefits, the conduit hub 906 could be configured to support two principal functions: UPC item scanning, and non-UPC (gift card) scanning. Considering first the processing for a normal retail UPC item sale, which begins with the scan of a UPC barcode 802 (see FIG. 8A), the scanner 804 sends its output 806 to the conduit hub 906, which passes the message 908 to the point of sale software 812 transparently (i.e., without modification). The existing retail software 812 and 832 then processes the item as usual, and sends receipt text 908 via the conduit hub 906 transparently to the printer 854. Normal UPC items may thus flow through virtual connections that link the point of sale software 812 with the scanner 804 and printer 854 via the conduit hub 906 and its physical connections 806, 908, and 856. This mode of operation is similar to that of a conventional hub or router, since the messages are not manipulated.

Figure 9B:
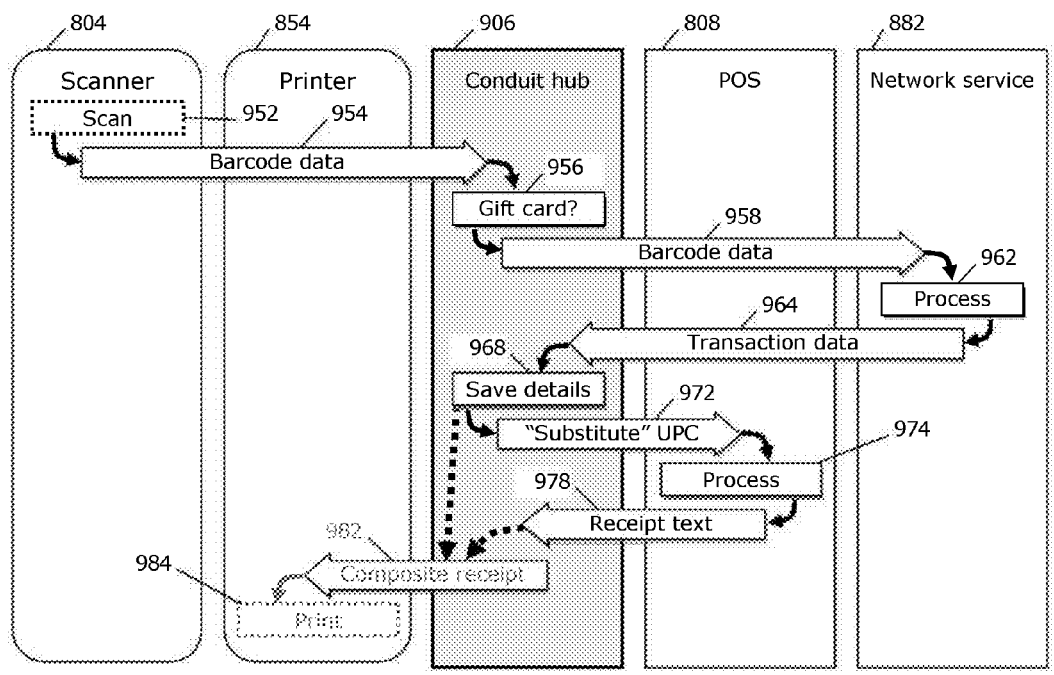
FIG. 9B traces transaction events through the system of FIG. 9A.

Proceeding to FIG. 9B, conduit rules could specify different logic for processing a non-UPC barcode 872, such as from a gift card. After the non-UPC barcode is scanned 952, the data 954 may be tested 956 using a conduit rule (e.g. "test for a 30-digit value"). Instead of sending this data transparently to the point of sale (POS) system 808, as with a UPC item, the conduit hub 906 could send a message 958 to the network service provider 882, which would process it 962 and return a reply 964 (normally an acknowledgment with a transaction ID, or possibly an error message). The conduit hub 906 could save the pertinent details for later printing 968, and then generate a "substitute" UPC item number 972, which it would pass to the point of sale (POS) system 808 for normal POS processing 974, such as cash register and accounting logic. Later, the conduit hub 906 could intercept receipt output 978 generated for the item (which is the response the retail system would have given if the "substitute" UPC 972 had actually been scanned 804). The conduit hub 906 could now use the gift card data stored earlier 964 and 968 from the network processor response, in conjunction with the receipt output 978, format a receipt 982, and send this to the printer 984 and 854. Thus, non-UPC items would flow among the same connections used in UPC item processing 812, 804, and 854, while also diverting some messages to the network service provider 882. Messages would travel via the conduit hub's physical connections 806, 908, 910, and 856.

Returning to FIG. 9A, it is worth noting that the retail systems 812 and 832 require at most minor adjustments 914, such as to receive daily reconciliation or audit reports from the network service provider 882. Moreover, such changes (e.g. receiving files or adapting report programs) are generally much simpler than altering the complex real-time data communications applications 812 that serve scanners, printers, and other point of sale devices. In this example, no changes have been required in the core barcode, accounting, payment, and receipt processing of the existing POS system 812.

Figure 9C:
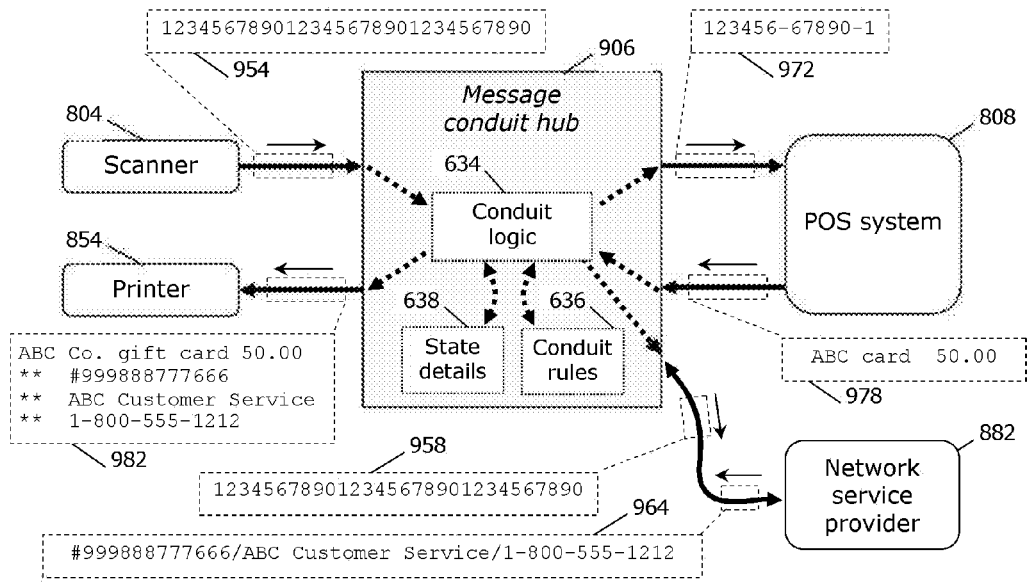
FIG. 9C traces transaction data flow through the system of FIG. 9B.

Proceeding to FIG. 9C, example data elements from a single non-UPC barcode transaction can be traced as they move through the steps shown in FIG. 9B. After the barcode data 954 is read by the scanner 804, it is sent through the conduit hub 906 where conduit logic 634 could manage state details 638 and apply conduit rules 636 to determine appropriate actions. For example, conduit rules 636 governing the scanner/POS conduit 804 and 808 could specify that a) UPC barcodes are passed through without modification, as described above, and b) 30-digit barcodes are diverted. In this example, the conduit hub 906 would send the non-UPC barcode data 954 and 958 to the network service provider 882, which would reply with a transaction number and receipt text 964. The conduit hub 906 could save this information in its state details 638, and then send a particular substitute UPC code 972 to the point of sale POS system 808 for processing. In this example, a specific UPC number might be encoded within the conduit rules 636. The network service provider 882 might instead provide such a value in the transaction response 964.

After normal POS processing, the POS system 808 would send UPC item receipt text 978 to its printer connection, which would transit the message conduit hub 906 where the text could be intercepted. The conduit rules 636 could specify that receipt text content 978 should be interpreted in light of state details 638 (set during the first part of the transaction), to detect printer output 978 that has resulted from a gift card transaction 957, 964 and 972. In this example, the conduit hub 906 (having detected such a case) could assemble the correct receipt text 982 based on the conduit rules 636 (which could specify how to merge the network transaction data 964 with the POS data 978 and to format the result). Thus, the conduit hub 906 could process non-UPC items subject to logic 634, state 638, and conduit rules 636, which could merge a "substitute" UPC transaction 972, 808, and 978 with data 964 from a network service provider 882. FIGS. 9A-9C show how an embodiment of the present invention may simplify the system changes described in FIGS. 8A and 8B. With this application in mind, algorithmic conduits may be examined more closely, to see how their use alters software development in data communications applications.

Figure 10A:
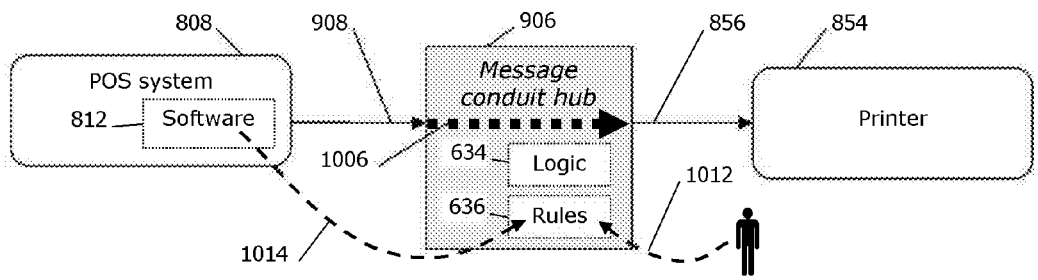
FIG. 10A shows one algorithmic conduit from FIG. 9C that connects a POS system and a printer.

Proceeding to FIG. 10A, the use of one embodiment of the inventive message conduit hub 906 in the example shown in FIGS. 9A through 9C can be seen to alter the original relationship between the POS system 808 and the printer 854 as shown in FIG. 8B. The conduit hub 906 has preserved the existing physical connections (via 908 and 856, defined by shared messaging interfaces and standards in preexisting the POS software 812 and printer 854 firmware; see FIGS. 1-4). It has also created an algorithmic conduit 1006 that links the two endpoints 808 and 854 under the control of conduit logic 634 managed using explicit conduit rules 636. This approach decouples the POS software 812 from the transfer of data to the printer. Output is sent through a virtualized printer connection, which can be controlled externally within the conduit hub 906 rather than by the POS software 812. This architecture thus enables the missing capability described in FIG. 5C, by turning a "dumb" connection into a "smart" one.

The logic 634 and conduit rules 636 of FIG. 10A may support a broad range of operating modes, as discussed below under the headings "Modes of Operation" and "Conduit Rules." When contrasted with traditional methods, algorithmic conduits and the conduit rules that control them are better building blocks for constructing communication systems, because they implement the primitive operations needed for dataflow processing. The conduit rules may be easily modified, and may be changed dynamically either by manual operations 1012 or under program control 1014. This approach allows adaptation of systems to changing environments or circumstances, without reprogramming.

Figure 5A:
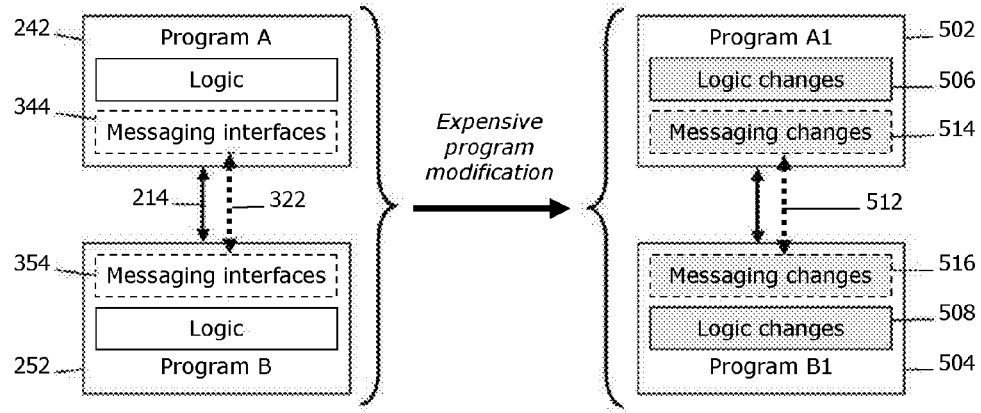
FIG. 5A shows how an existing communication system might be changed by replacing the programs at each end of the link.
Figure 5B:
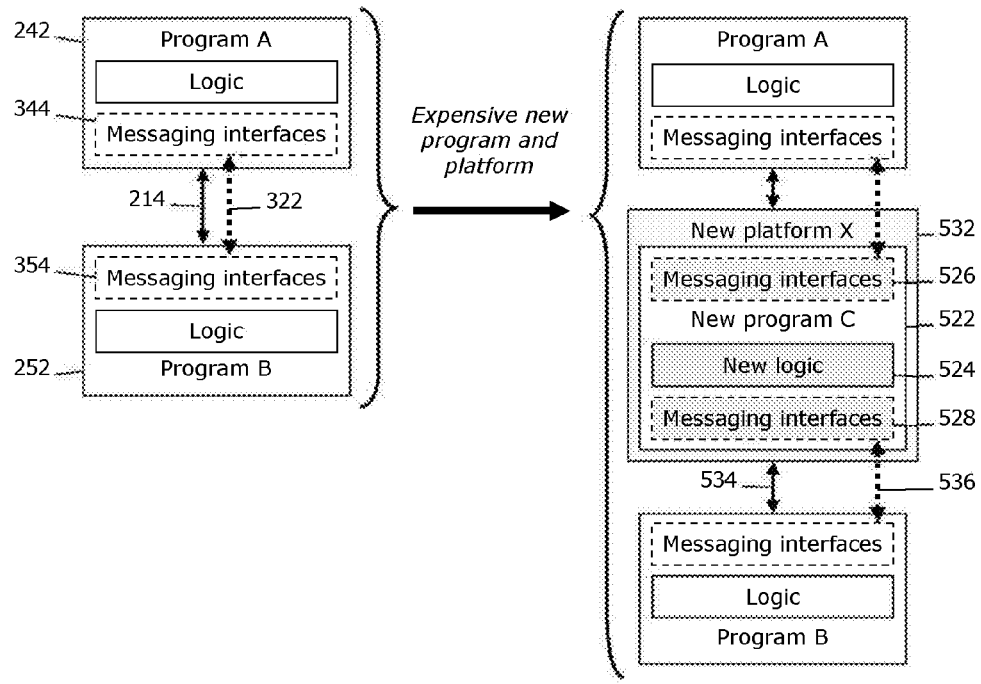
FIG. 5B shows how an existing communication system might be changed by creating a new program, and then installing it between the current endpoints.
Figure 5C:
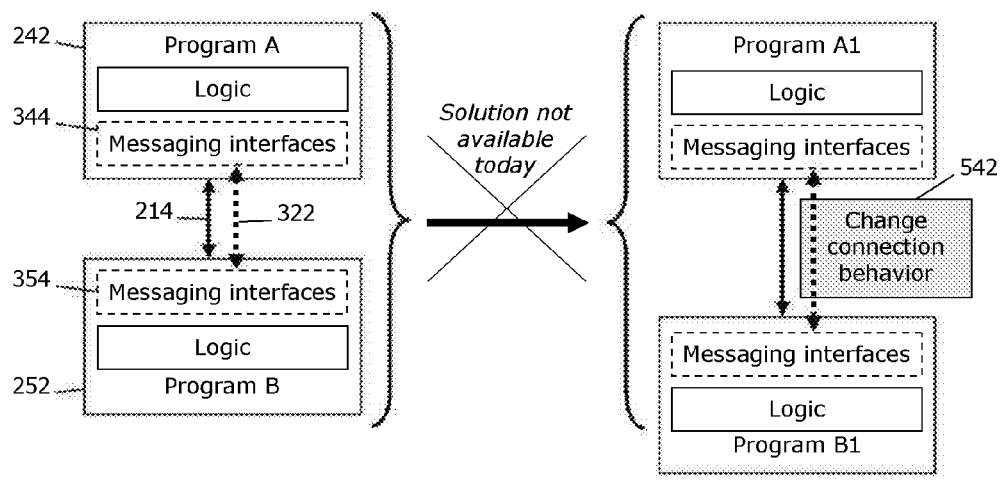
FIG. 5C shows how the art does not provide a way to modify an existing communication system by altering the properties of the connection.
Figure 10B:
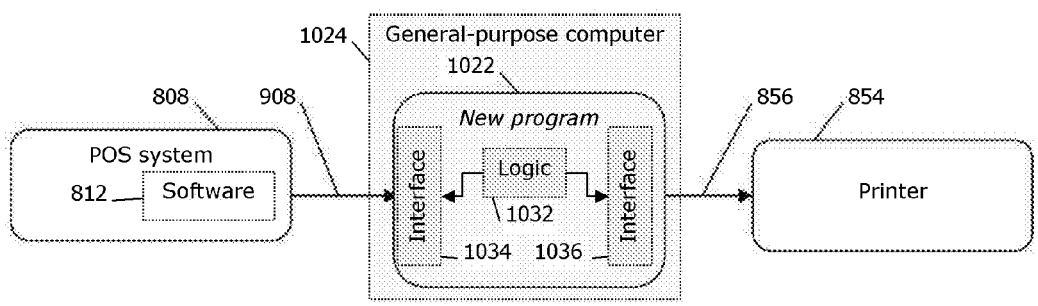
FIG. 10B contrasts the configuration of FIG. 10A with a traditional three-tier implementation, which inserts a new program between the POS system and the printer.

Proceeding to FIG. 10B, the elements of FIG. 10A are contrasted with the traditional three-tier architecture illustrated in FIG. 5B. In this example, instead of using the inventive message conduit hub 906 of FIG. 10A, a custom program 1022 has been created and placed in the same physical configuration. While FIGS. 10A and 10B may appear superficially similar, the solutions are very different. The new program 1022 of FIG. 10B uses conventional program logic 1032 and messaging interfaces 1034 and 1036, rather than the algorithmic conduit design 1006 of FIG. 10A supported by built-in logic 634 and user-configurable conduit rules 636. Any functionality provided for the new custom program 1022 must thus be created from scratch through "brute force" by using available tools. Since algorithmic conduits are not directly supported by existing methodologies or libraries, most programmers would need to choose different techniques.

The new program 1022 illustrated in FIG. 10B links two physical devices 808 and 854. It must thus be placed on a separate system 1024, connected between those devices. Because the program 1022 has been custom-built for this particular application, it would probably be installed on a general-purpose computer 1024. This decision would introduce security and reliability issues than would differ from those of an inventive message conduit hub 906 (which, if designed, configured, and tested for use in such applications, could have security and reliability profiles more like those of a router or firewall than of a general purpose computer system 1024).

Middle-tier applications, such as the custom program 1022 of FIG. 10B, are notoriously difficult to design, build, test, and deploy, because they mitigate between two sets of real-time interfaces, and sustain two sets of related simultaneous dialogues. Such systems are prone to difficult race conditions, deadlocks, synchronization errors, protocol anomalies, and many other well-known failure modes. For these reasons, systems like 1022 and 1024 are normally only employed in those situations where they are essential, such as firewalls, "DMZ" security barriers, traffic analyzers, routers, and telecommunications switches. Such systems are usually built by experienced systems programmers and communications engineers, not by business application programmers (such as those who build retail point of sale systems). Thus, whereas FIG. 10A creates a "smart" linkage between two communicators, FIG. 10B uses the different approach of adding a third communicator 1022 between the two endpoints, resulting in a complex system containing three "smart" elements 812, 1022, and the printer's firmware 854, plus two "dumb" linkages 856 and 908.

It should be clear that a custom "clean sheet" solution 1022 as just described in FIG. 10B lacks the conduit logic 634 and conduit rules 636 of a general-purpose conduit hub 906, with its built-in functional breadth and update mechanisms 1012 and 1014. A programmer with such an assignment might simulate certain aspects of the particular algorithmic conduit 1006 used in this example, such as its assembly of receipt text as described above, in a specific realization of a generic mechanism. However, in the absence of conduit building blocks, any such features would necessarily be constructed piecemeal, drawing on the tools and methods of the chosen platform 1024. Thus, as shown in FIGS. 10A and 10B, the use of algorithmic conduits as implemented by this invention is very different from traditional communications programming. FIG. 10B shows a three-node connection, which uses conventional programs and messaging interfaces to establish two sets of implicit connections, and which therefore represents a major software development investment. FIG. 10A avoids most or all programming, by using a rules-based algorithmic conduit to implement a "smart" linkage.

Higher-Level Connectivity Embodiments

The descriptions of FIGS. 8A through 9C, above, show how an embodiment of the present invention can reduce software development costs and improve functionality when modifying a system utilizing lower-level connectivity, such as scanner and printer connections. In another set of analogous examples, FIGS. 11A through 12C consider applications that utilize higher-level connections such as web interfaces.

Figure 11A:
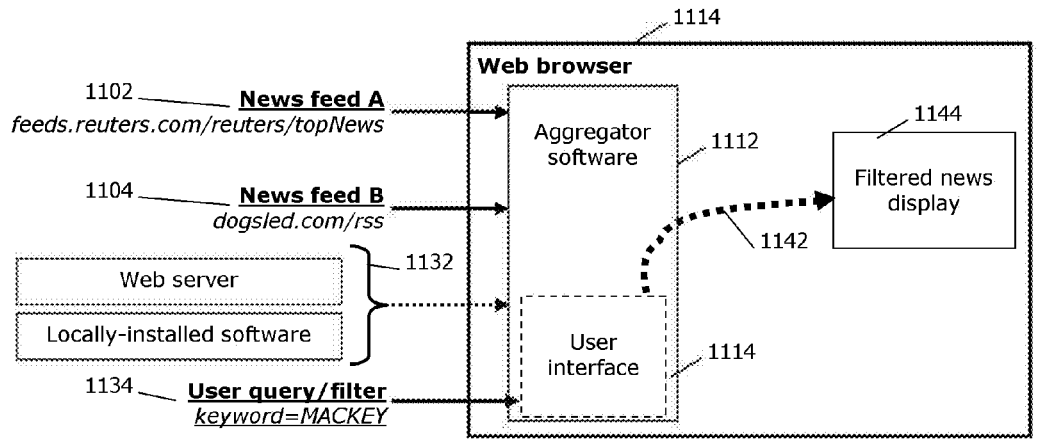
FIG. 11A shows how a web browser plus aggregator software (such as a newsreader) might apply queries or filters to a pair of independent data feeds.
Figure 11B:
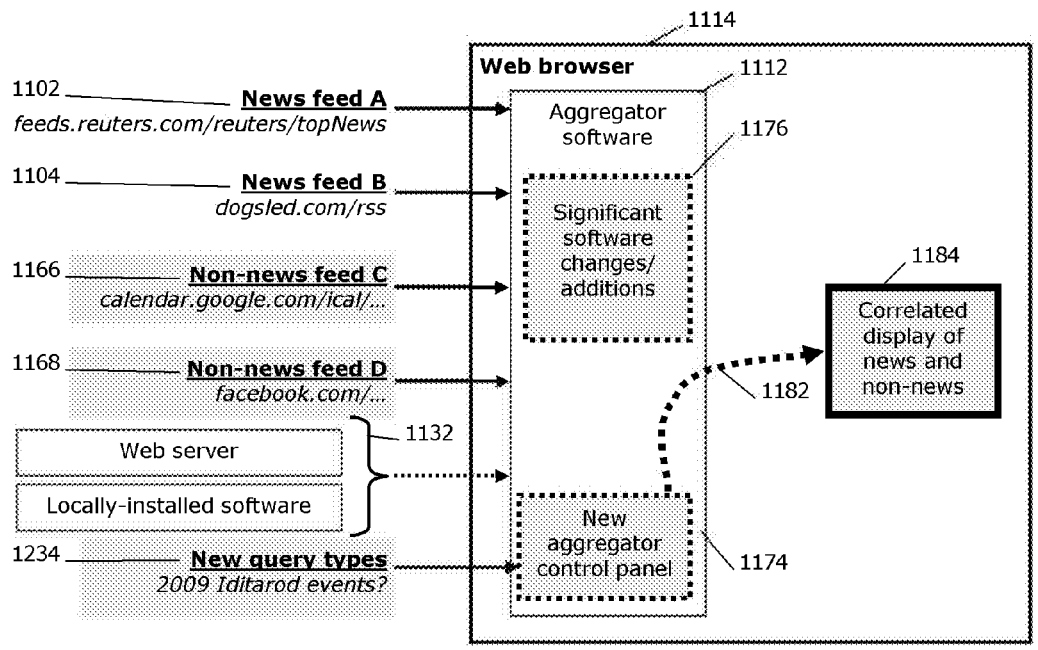
FIG. 11B show that enhancing the example of FIG. 11A by adding new data sources and control features could require major software changes.

Proceeding to FIG. 11A, an Internet news application illustrates software connectivity techniques in common use. The two news feeds 1102 and 1104 are website sources, used as input to a news aggregator 1112. The aggregator 1112 is displayed within a standard web browser 1114 and retrieves data from the sources 1102 and 1104. The aggregator 1112 might be one of many popular stand-alone newsreaders, or it might be a component of a custom web application accessed from a web server. Regardless, the browser 1114 loads 1132 the aggregator 1112, which supports user operations such as queries or filter requests 1134. The aggregator 1112 scans the feed traffic 1102 and 1104 to produce desired output 1142 and 1144. FIGS. 11A and 11B thus include two lower-level connections 1102 and 1104 (i.e., URL or IP pathways which might share a single physical Internet connection), and also virtual connections that carry data on these pathways and that provide control input 1134 and output 1142. Although the system in FIG. 11A is a simplified example, it illustrates a class of connections and relationships typical of contemporary web-based applications, often referred to using such terms as Web 2.0, SaaS (software-as-a-service), web-hosted applications, and "cloud computing." Such applications often implement "mash-ups" of multiple independent data sources, combining (for example) stock quotes with news stories, invoices with supply chain data, or search results with advertising.

Proceeding to FIG. 11B, the system from FIG. 11A might be modified to meet changing user needs. In this example, the system is expanded to incorporate new types of data feeds not supported by the existing aggregator, and also to augment the user interface with new controls and query mechanisms. Such application changes are frequently requested and implemented today, both in user-installed aggregator software tools 1112 and also in websites 1132 that include behind-the-scenes aggregation services. Steady advances in web use and technology promise a continuing stream of similar feature requests. FIG. 11B illustrates the same aggregator 1112 loaded 1132 into the same browser 1114 of FIG. 11A, accessing the same two news feeds 1102 and 1104. In addition, it now incorporates two non-news feeds 1166 and 1168, plus a new control panel 1174 with new features. In this example, these improvements have required software changes 1176 within the aggregator, which are needed to access the new feed types, to recognize the new query capabilities 1234, and to produce 1182 the desired output 1184. Thus FIG. 12 includes four lower-level connections 1102, 1104, 1106, and 1108, and also virtual connections that carry data on these pathways and that provide control input 1234 and output 1182, all of which contribute to the changed set of features.

Because existing aggregator systems such as those shown in FIGS. 11A and 11B are often sophisticated, modifying them might be difficult and/or expensive. Moreover, a user may not have the ability to modify the existing system, perhaps because it is owned by a third party, or because a large user community exists that does not share this user's particular needs. Historically, although some software providers and users have chosen to invest in such modifications, the difficulty of making software changes has been a barrier to the expansion of features. This situation applies with many end-user tools.

Figure 12A:
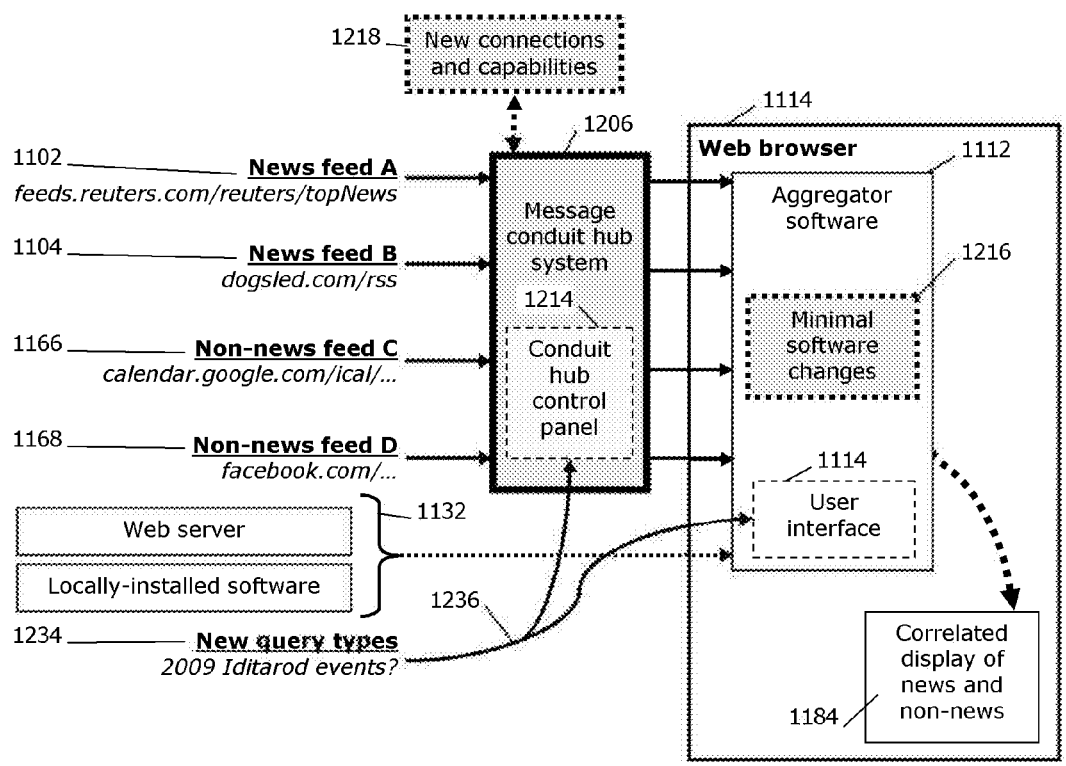
FIG. 12A shows how an embodiment of the present invention can reduce the software changes otherwise required in FIG. 11B.

Proceeding to FIG. 12A, an embodiment of the present invention could be used to reduce the cost, effort, complexity, and impact of implementing the functionality of FIG. 11B relative to the system of FIG. 11A. An inventive message conduit hub system 1206 is shown to be inserted between the data sources 1102, 1104, 1106, and 1108 and the aggregator software 1112, analogous to the gift card processing example of FIG. 9A. In this example, the conduit system 1206 is shown to be independent of the web browser 1114, for use in conjunction with the aggregator software 1112. (In another embodiment, the conduit system 1206 could be operated within the browser 1114, either by downloading it from a web server, loading it from a local installation 1132, or packaging it with the aggregator 1112.) The existing aggregator 1112 is accessed as in FIG. 11A, through its normal user interface 1114. In this example, user control has been enhanced by the addition of a conduit hub control panel 1214; the two elements now work together 1236 to support the desired new query types 1234. No significant software changes 1216 are required in the aggregator, which uses its existing features to process output from the conduit hub 1206. This example also provides the opportunity for additional connections and capabilities 1218 without the need for software changes, enabling other improvements beyond the feeds and controls shown. For example, the conduit hub 1206 could be configured to analyze, transform, or filter its traffic, and provide the result as an additional, distinct input feed for the aggregator. FIG. 12A thus interposes an inventive message conduit hub system 1206 within the existing four lower-level connections 1102, 1104, 1106, and 1108; virtual connections support these data feeds, and also place them under user control 1114, 1236, and 1214.

As an alternative to utilizing the conduit hub system 1206 shown in FIG. 12A, a stand-alone program could be built from scratch through "brute force" as discussed with FIG. 10B. Conventional software development techniques could be used to build the necessary browser add-ins, website scripts, client-side packages, or similar elements, and link them into the existing environment of FIG. 11A. A separate computer platform (analogous to system 1024 in FIG. 10B) would probably not be required, since the necessary components could all operate on the same platform used in FIG. 11A. However, building a complex three-tier application might exceed the work needed to modify a conventional aggregator.

Figure 12B:
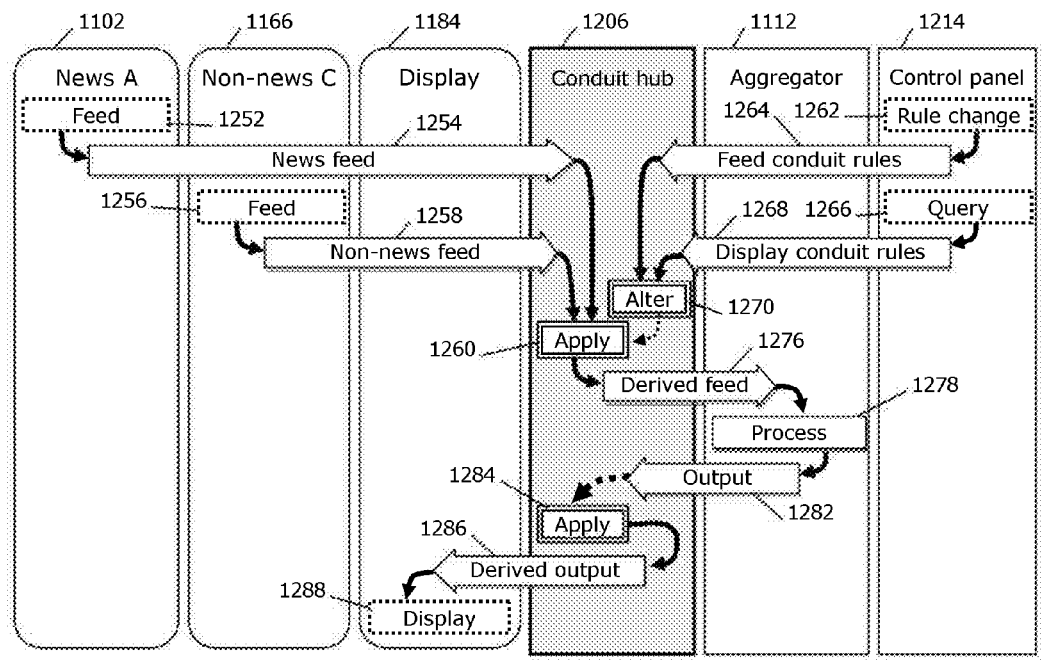
FIG. 12B traces transaction events through the system of FIG. 12A.

Proceeding to FIG. 12B, the system of FIG. 12A responds to a number of events during user query processing. Two feeds 1102 and 1166 are shown, with the others omitted for clarity. As messages arrive from each feed 1252, 1254, 1256, and 1258, they feed an inventive message conduit hub 1206, which applies 1260 existing conduit rules to the messages. In the meantime, the user may enter a rule change 1262 via the conduit control panel 1214, such as a change in the filters on the feeds; this arrives 1264 at the conduit hub 1206. The same logic applies when a user query is entered 1266 and 1268, which might take the form of a change in rules for post-processing or filtering of the aggregator output. Rule changes 1262 and queries 1266 alter 1270 the stored set of conduit rules, which affect the generation 1260 of the derived feed 1276. This feed 1276 is continuously sent to the aggregator 1112, which independently performs its processing 1278 and generates output 1282. The output 1282 is post-processed by applying the associated rules 1284, which in turn creates the desired output 1286 which is displayed to the user 1288.

Figure 12C:
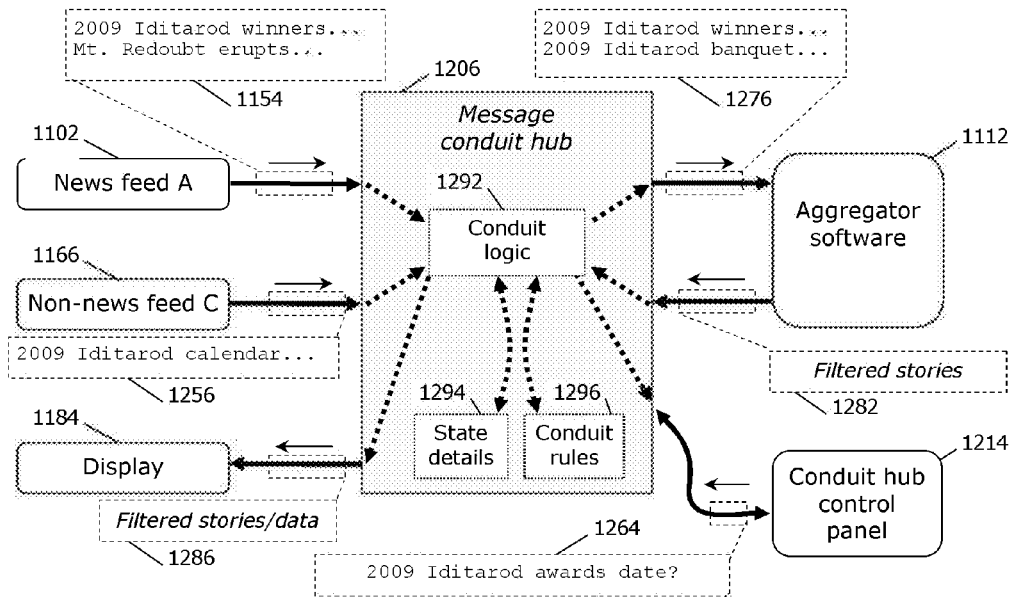
FIG. 12C traces transaction data flow through the system of FIG. 12B.

Proceeding to FIG. 12C, elements of FIGS. 12A and 12B are shown in their roles during user query processing. The two feeds 1102 and 1166 feed an inventive message conduit hub 1206 connected to aggregator software 1112 and a conduit hub control panel 1214. Two sets of messages 1154 and 1166 arrive at the conduit hub 1206 from the feeds 1102 and 1166 respectively. The conduit hub 1206 employs conduit logic 1292, including state details 1294 and conduit rules 1296, to process the feeds 1102 and 1166. When a user control request or query 1264 is entered at the control panel 1214, this causes updates to the state 1294 and/or conduit rules 1296; such updates are themselves subject to the existing conduit rules 1296. In this example, the logic 1292 has been configured by the conduit rules 1296 to select and filter data from each feed 1102 and 1166, and to produce correlated input 1276 for the aggregator. The aggregator 1112 performs its normal operations, which may utilize separate control and query activities (not shown) via its existing user interface 1114. The aggregator produces results 1282 which are in turn intercepted by the conduit hub 1206, where additional conduit rules 1296 based on state details 1294 produce the desired output 1286 on the browser display 1184. The conduit hub 1206 thus processes the data feeds 1102 and 1166 subject to logic and conduit rules 1292, 1294, and 1296, interacts with the aggregator 1276, 1112, and 1282, and creates output 1286 in accordance with user requests 1214 and 1264.

Advantages of Algorithmic Conduits

Embodiments of the present invention can utilize algorithmic conduits to control lower-level and higher-level connections, and can thereby add capabilities for enhanced data operations such as, for example, monitoring, analysis, filtering, transformation, optimization, temporary storage, summarization, validation, encryption, routing, or correlation of data streams.

To contrast this invention with alternative methods, consider three common uses of existing connection technologies. First, existing technologies often support connections between independent pairs of devices or applications. Examples include: a) an RS-232 cable that connects a computer system to a modem; b) a USB hub that creates several distinct logical connections between a computer system and each of several peripheral device endpoints; c) a router that breaks a data stream into packets and forward them on separate paths, each selected as appropriate based on data content; or d) a UNIX or Windows pipeline that connects a named data source with a destination. This first group of examples all deal with paired connections. Second, existing connection technologies are sometimes used to merge or split data streams among groups of endpoints. Examples include: a) diagnostic tools that monitor USB or other ports; b) simulcast mechanisms that duplicate data streams; or c) software applications that process multiple data sources, directing output to multiple destinations. Third, a class of existing connection solutions sometimes support connectivity or dataflow applications that operate within a single environment or system. Examples include: a) inter-thread and inter-process communications within an operating system like Linux or Windows; b) object-, class-, or message-based designs built in languages like Smalltalk, PHP, or Java, where communications is intrinsic to the semantics of the system; c) pipeline-based frameworks such as CMS Pipelines or Python Pipelines, which offer flexible ways to route messages among programs. In all these examples, existing connection technologies serve to transfer each particular datum or message to the correct destination(s) in the correct format(s).

Thus practitioners currently choose from a diversity of connection technologies and protocols, which in general have focused on the problems of how to assemble messages in the correct formats, how to send messages, how to route messages, and how to parse and process messages after they arrive. These mechanisms have not addressed the creation and management of message conduits as independent entities. Instead, these mechanisms create message conduits implicitly in use, as the consequences of platform, design, and connection decisions. For example, the behavior of lower-level connections usually depends on physical connectivity choices or simple routing rules, and the behavior of higher-level connections usually depends on the choice of scripts, programs, packages, operating systems, messaging framework, or programming languages for each endpoint. Unlike the algorithmic conduits described herein, traditional connections have limited options. They are not sensitive to message content, nor to relationships within the data streams they carry. Options and flexibility are only manifested at connection endpoints.

It is instructive to consider a practical application, such as the examples shown in FIGS. 8B and 9A, and contrast how the functionality of FIG. 9A may be addressed using an embodiment of the present invention, versus a) using different equipment that could support connections like those in FIG. 8B; or b) using other ways to perform the gift card business function, without interconnecting devices in a similar manner.

Regarding other equipment that might support connections like those in FIG. 8B, consider the range of available hubs, switches, routers, firewalls, computer systems, and other ways to interconnect scanners, printers, POS systems, etc. These systems fall into two categories: a) devices that route messages between endpoints based on address (such as hubs and switches), and which therefore do not enable data stream processing of the type described herein; and b) systems that could be manually programmed to support three-tier applications, such as general purpose computer systems. Both approaches would require significant custom development, and neither offers an economical way to implement the system of FIG. 8B or the superior solution of FIG. 9A.

Regarding other means for meeting the business need of FIG. 8B that aren't based on connection techniques, consider the range of alternative strategies. These also fall into two categories: a) creating hand-coded software applications, either integrated with or separate from existing systems, that are explicitly designed to handle gift card processing; and b) altering the system environment or business rules to eliminate the need for coordination of multiple data streams. Both approaches would require significant changes in existing systems or business goals, and neither offers an economical way to implement the business capability shown in FIGS. 8B and 9A.

Another useful point of contrast between embodiments of this invention and other methods is in its provision of application-oriented control interfaces. In practice, the user interface of a system often determines its scope, sophistication, value, and complexity. Contrast an inventive message conduit hub system, controlled via conduit rules and the other mechanisms described herein, versus a system with no independent control interface, and relying on traditional software programming for customization. Embodiments of the present invention, by design, offer the user with nonprocedural stream-oriented building blocks, and may thus be easily and directly applied to many data manipulation and transformation problems, and later changed as required. As a result, users can avoid custom development and adapt systems to changing needs.

A useful analogy regarding the present invention can be observed in the evolution of programming methods, in which the industry has progressively made its building blocks "smarter" by separating them. For example, procedural languages such as FORTRAN were designed to express computations efficiently. Research into software maintenance problems led to the separation of "smart" program elements (such as via structured programming and library use). Research into data management problems led to the separation of "smart" data and data structures (such as via database technology and data-oriented languages). Research into user interface problems led to the separation of "smart" interfaces (such as via report writers, markup languages, and the model-view-controller paradigm). Research into semantics and communication problems led to separation of "smart" messages (such as via object-oriented, protocol stack, and message-passing technologies).

The current disclosure takes a similar step, by separating programs from the links between programs. Just as databases create "smart" and object technology creates "smart" messages, algorithmic conduits create "smart" connections that can play an active role in defining an application's overall behavior. Embodiments of the present invention offer a useful and timely step forward in technology, by providing devices or systems that enable easily-configured algorithmic conduits, capable of correlating the traffic among data streams. By creating and managing "smart" connections, such embodiments avoid the need to implement or change endpoint programs, and provide new modalities for the interoperation of such programs.

Minimalist Implementation

Figure 13:
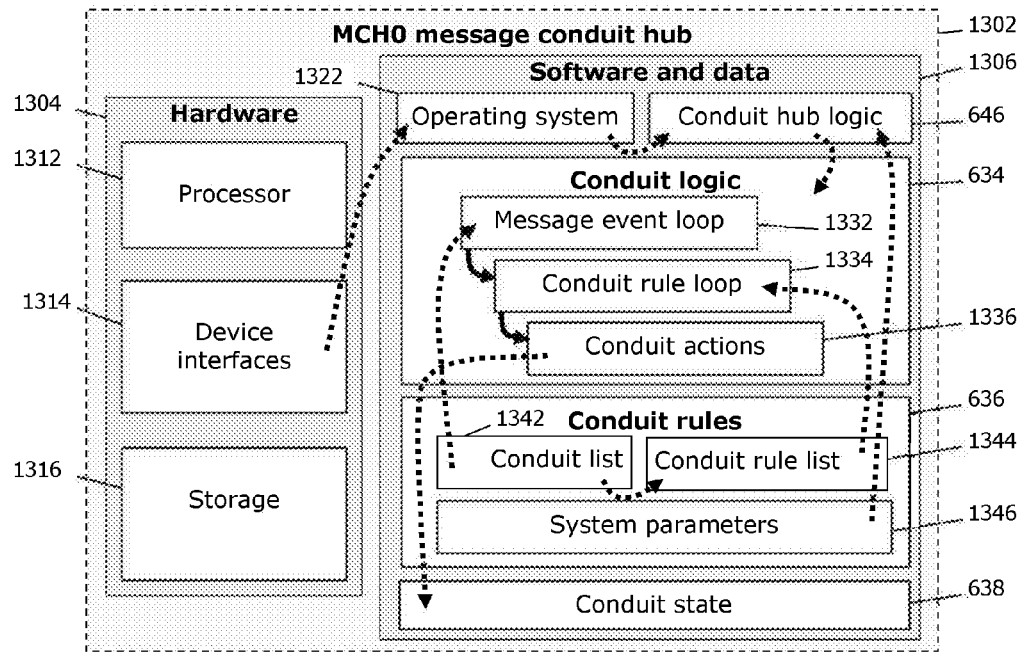
FIG. 13 presents a block diagram of a simple embodiment of the present invention, suitable for a dedicated application.

Proceeding to FIG. 13, this block diagram of an inventive message conduit hub 1302 ("MCH0") comprises hardware 1304 plus software and data elements 1306 in a simplified configuration. This embodiment might be suitable for a dedicated single-purpose application, such as an appliance, an automobile, or a guidance system. FIGS. 14-17, described below, expand this design to meet a broader range of applications. The hardware components 1312, 1314, and 1316 and the operating system 1322 are typical of small computer systems, having specifics that are not critical at this level of detail. The software and data elements 1306 comprise the principal elements discussed in FIGS. 6A through 7, such as conduit hub logic 646 (which operates the system), conduit logic 634 (which operates its algorithmic conduits), conduit rules 636 (which specify algorithmic conduit properties), and conduit state 638 (which manages persistent data during operation). The conduit logic 634 may be implemented by a straightforward program similar to the flowchart in FIG. 7, comprising a major event processing loop 1332 (which receives messages), and a conduit rule loop 1334 (which applies the relevant conduit rules for each message). In this example, conduit rule elements 636 are retrieved using a list of algorithmic conduits 1342 linked to a list of all the conduit rules 1344. System parameters 1346 could contain startup and system interface details.

This example has been chosen for simplicity, including the bare minimum of algorithmic conduit services, with limited tools for administration, ease of use, or application support. Such a minimalist system might be chosen for an embedded system, a constrained platform, or a special-purpose application.

Figure 14:
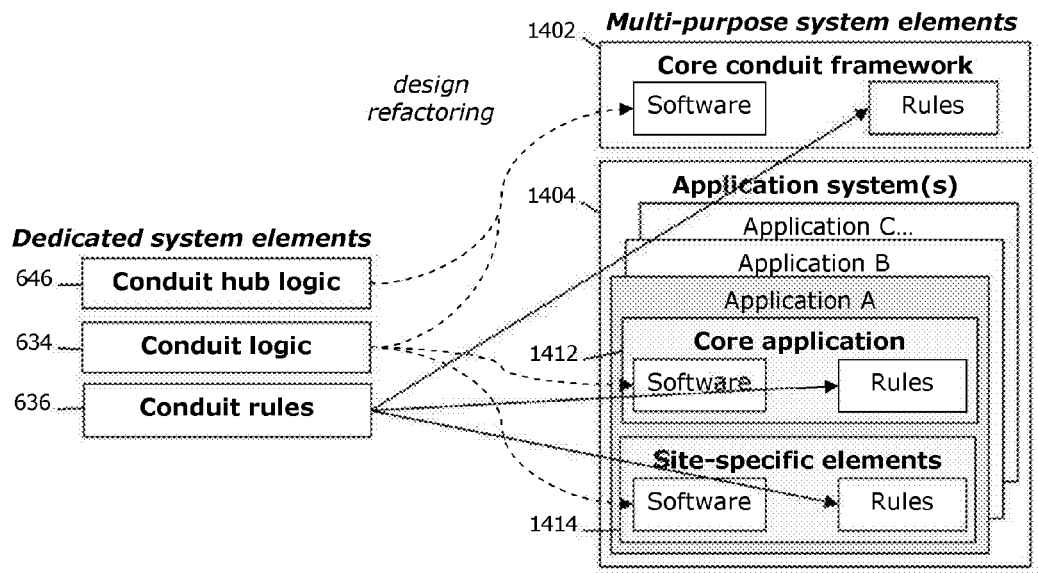
FIG. 14 shows how the elements of FIG. 13 could be refactored to create a multi-purpose configuration.

Proceeding to FIG. 14, the simplified design of FIG. 13 could be generalized for a different platform 1402 intended to support a wider range of applications. This adaptation could be done by "refactoring" the design elements to meet different needs. In this example, the simple software elements 634 and 646 and rules elements 636 of FIG. 13 have each been broken up, and the pieces reorganized in a series of components that each contain separate software and rules elements. Thus a core conduit framework 1402 could contain system software and global rules derived from dedicated system elements 646 and 636, implementing the basic algorithmic conduit logic and common to all applications. Similarly, an open-ended set of application systems 1404 could contain software and rules derived from dedicated system elements 634 and 636, with each of the application systems 1404 supporting a range of uses and locales. Each application's components could be further divided into two parts: a core application 1412 which is common to all systems that use the application, and site-specific elements 1414 which could vary by unit, location, company, etc. FIGS. 13 and 14 thus illustrate how a simple implementation 1302 could support the flow of FIG. 7, and also show how such a design could be generalized through refactoring to yield a multi-purpose platform 1402 and 1404 (described in more detail below).

Implementation Details

Figure 15:
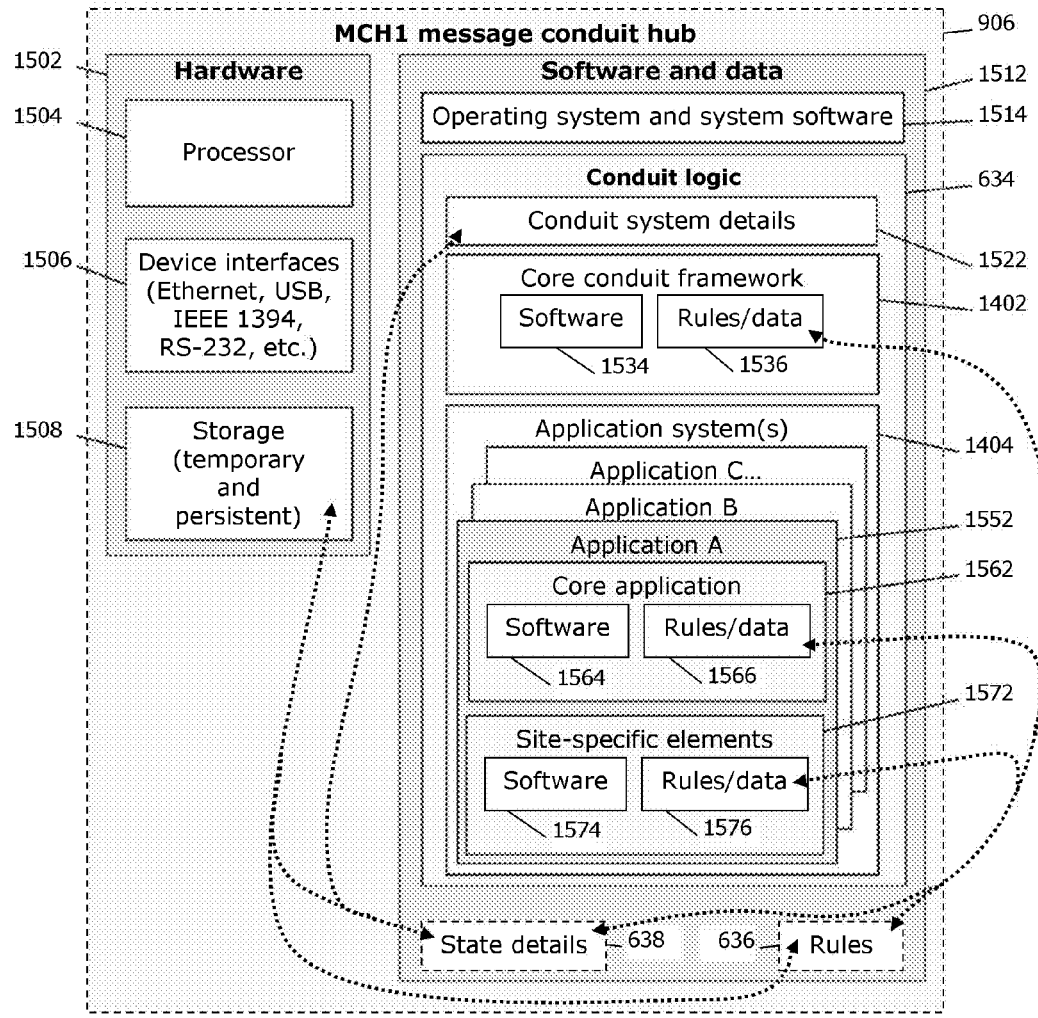
FIG. 15 presents a block diagram of an embodiment of the present invention as used in FIG. 9A, using the refactoring shown in FIG. 14.
Figure 16:
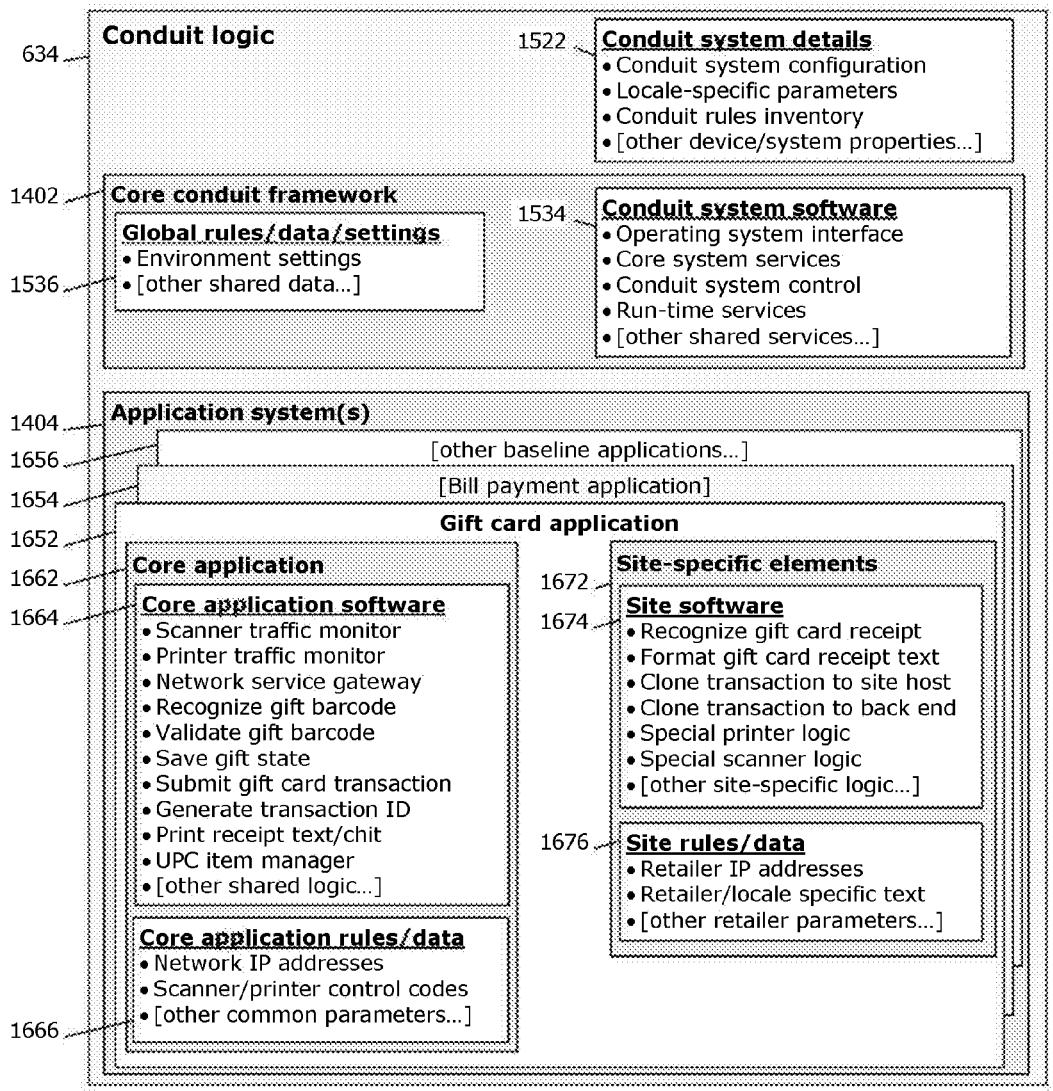
FIG. 16 presents a more detailed block diagram of the "conduit logic" element from FIG. 15.
Figure 17:
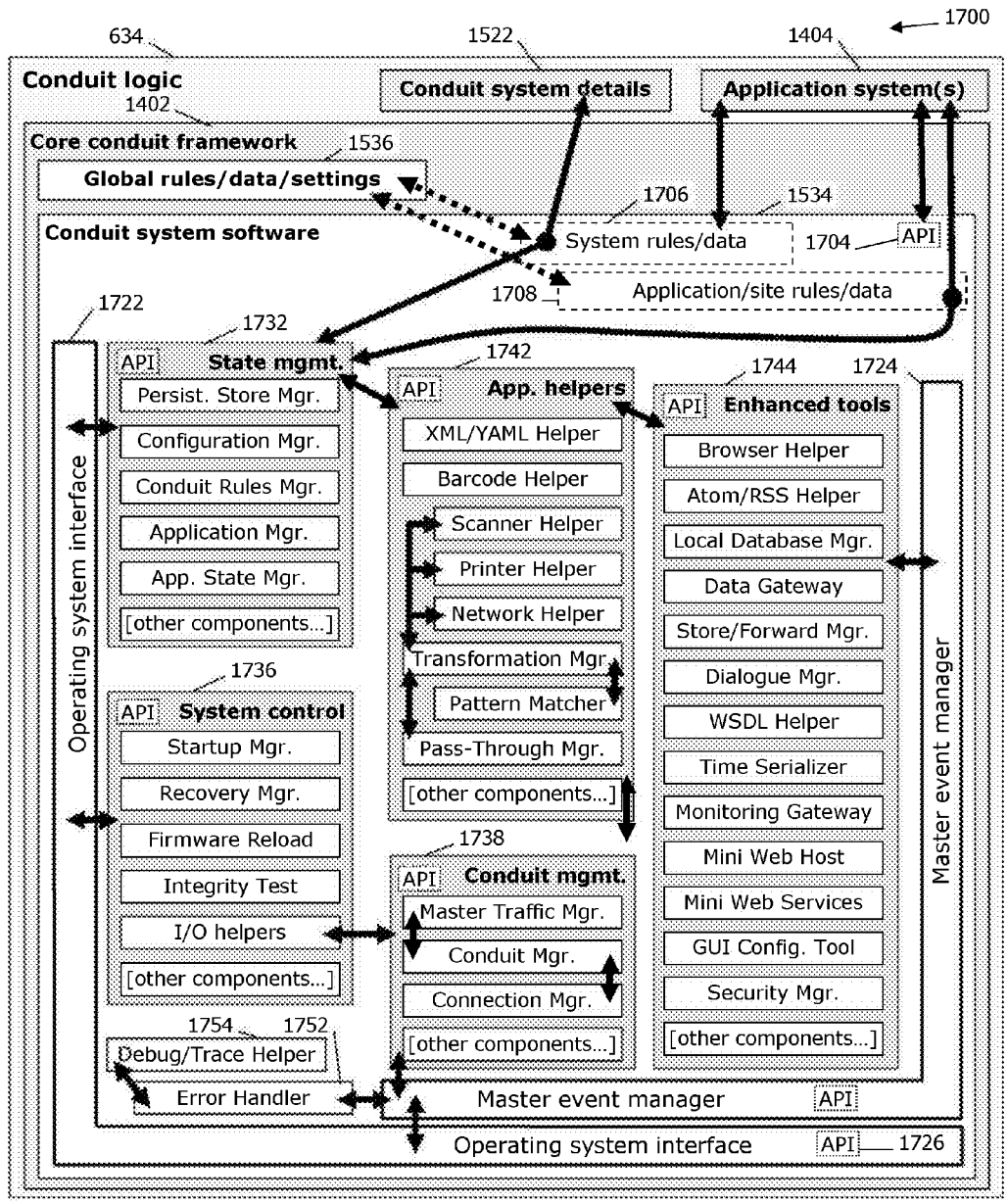
FIG. 17 presents a more detailed block diagram of the "core conduit framework" element from FIG. 15.

FIGS. 15-17 illustrate an example embodiment of the present invention that is suitable for the retail application shown in FIG. 9A, and which utilizes the multi-purpose platform architecture illustrated in FIG. 14. Proceeding to FIG.

15, a block diagram of an inventive message conduit hub 906 ("MCH1") comprises hardware 1502, 1504, 1506, and 1508 and software/data elements 1512. For this checkout lane application, implementation might utilize a standard low-cost single-board computer (SBC), as is commonly used in the art for creating embedded systems, which might incorporate standard features corresponding to elements in FIG. 15 such as an ARM9 CPU (processor 1504), many input/output paths (device interfaces 1504), RAM and Flash RAM memory (storage 1508), and Linux software (operating system 1510). Major components of the conduit hub 906 comprise its conduit logic 634, state details 638, and conduit rules 636, described below. The resulting system 906 may be a compact appliance-style device capable of supporting algorithmic conduits, and which may be comparable in size, cost, and appearance to a conventional router or hub. A diversity of suitable commercial and industrial computer products offer a wide choice of viable platforms, which might include (in 2008) Technologic TS-7800, Arcom VIPER, or Artila Matrix 500.

For use in the application shown in FIG. 9A, the conduit hub 906 would interconnect the elements shown (such as a point of sale barcode scanner 804, a point of sale printer 854, a point of sale (POS) computer system 808, a transaction processing network 882 accessible via a network infrastructure 836, and perhaps other unspecified devices). Each such connection may utilize a variety of technologies, such as cabling, wireless interfaces, hubs, routers, streams, datagrams, and other familiar methods, as are suitable for the particular devices and applications served. These connections would be supported by the physical sockets and other devices present on the hardware 1502 and 1506 (which might include USB host controllers, USB device controllers, Ethernet ports, serial ports, etc.), and also by the operating system, drivers, and other system software 1514 used on the platform. Available SBC and other platforms support diverse hardware and software options providing interface device control and data storage 1508.

With reference to the system's software and data 1512, the conduit logic 634 is the main software component, implementing persistent algorithmic conduits, message conduit configuration and management, and the other functions described herein, utilizing conduit rules 638 and conduit state 638 as described below. The conduit logic 634 comprises: a) conduit system details 1522 (e.g. configuration, identification, and static state data); b) a core conduit framework 1402 (the software 1534 and data 1536 that implement conduit processing and common services, described in more detail below); and c) the application system(s) 1404 (sets of software and data that tailor the system for a particular purpose, such as retail gift card processing or bill payment). As described in FIG. 14, the multi-purpose architecture employed in this embodiment allows many different application systems 1404 to be present on a particular message conduit hub 906, and these applications might also vary between individual conduit hub systems (whereas many such conduit hubs might all share the same core conduit framework 1402). Within each application, such as 1552, components may be divided between core elements 1562, 1564, and 1566 (which may be common to all conduit hubs that use this application), and site-specific elements 1572, 1574, and 1576 (that tailor a particular message conduit hub to a given locale, customer, operating environment, or other details).

FIG. 15 shows several sets of rules/data 1536, 1566, and 1576, which are distinct from the associated software 1534, 1564, and 1574. The rules/data elements play an important role in implementing algorithmic conduits, by supporting nonprocedural definition, configuration, and management of conduit behavior. Through the changing of tables and other data values, conduit behavior may be dynamically changed in ways that would otherwise have required programming. All such rules/data, collectively referred to herein as conduit rules 636, may be managed by the core conduit framework 1402, although (as explained in the description of FIG. 14), these rules comprise a combination of rules/data elements 1536, 1566, and 1576 within this particular embodiment, and may not be stored together as a distinct component. Similarly, the overall state details 638 of this embodiment might not be stored together as a distinct component, but might instead comprise a combination of rules/data elements 1536, 1566, and 1576, conduit system details 1522, and other elements. The consolidated rules 636 and state elements 638 may thus be managed in temporary and persistent storage 1508, under the control of the core conduit framework 1402 and operating system services 1514, as shown by the dotted lines in FIG. 15.

The choice and scope of specific hardware 1502 and standard software components 1514 used to implement the system in FIG. 15 may reflect application, configuration, and technical needs, as well as commercial expediency. Such details are not critical to the present invention. Together, the elements of FIG. 15 are intended to create a general-purpose connection framework for algorithmic conduits, including a platform for hosting conduit logic functions 634.

In other embodiments, similar elements 634, 638, and 636 may be implemented on different computer platforms, such as on a general purpose desktop or server computer, on a notebook computer, on the processing unit of a router or firewall, or on any other systems wherein the management of data streams using algorithmic conduits as described herein might be useful. The particular range of protocols, standards, interface components, and similar elements available on a particular implementation platform (USB, Ethernet, RS-232, etc.) are not critical to the present invention, and solutions analogous to those described herein could be built using different technical choices (RS-485, Firewire, DTMF, SCSI, XML, SPI, etc.). Similarly, the functions described herein might be implemented using a plurality of distributed or cooperative systems, rather than residing entirely on a single system. The present invention is particularly suited for multiprocessor and multi-system implementations.

Conduit Logic

Proceeding to FIG. 16, the conduit logic 634 from FIG. 15 is shown in a block diagram comprising major logic components in greater detail. Three main elements are illustrated, described in more detail below: a) conduit system details 1522 pertaining to a particular MCH1 unit, intended to give each device its "personality"; b) the MCH1 core conduit framework 1402, which may implement basic conduit management and system services via software 1534 and rules, data, and settings 1536 that are common to multiple MCH1 systems; and c) the application systems 1404 that may tailor a group of MCH1 systems for certain applications or users 1652, 1654, and 1656. In this example, we examine a gift card application 1652, which in turn may comprise core applications 1662, 1664, and 1666 (which may be common to all devices that use this particular application), as well as site-specific elements 1672, 1674, and 1676 (which may adapt the application for a particular location, retailer, or other context).

Thus conduit logic 634 can comprise a general-purpose framework, incorporating application- and site-specific elements, and utilizing a rich set of procedural and nonprocedural conduit rules 636 and state information 638 that in turn may consolidate multiple system and application elements 1522, 1536, 1666, and 1676 (as described in FIG. 15).

Conduit system details 1522 may be specific to each physical unit, adapting it to a particular setting. Key components comprise: startup parameters, a unique system identifier for use in transactions, and any hardware-, network-, or locale-specific data required to interoperate within a particular environment. These details 1522 may be used and interpreted by the other elements of the conduit logic 634, and may be particularly important during the system startup process, when configuration data may be retrieved from the device's persistent storage, such as an inventory of the active conduit rules and any saved processing state.

The example gift card application system 1652 illustrated in FIG. 16 is intended to adapt the core conduit framework 1402 for use in retail processing, and may be one of many such applications 1652, 1654, and 1656 installed on a particular device. It may comprise core 1662 and site-specific 1672 elements, which may in turn each comprise software 1664 and 1674 (which may be implemented via programming languages and other software development techniques) and rules/data 1666 and 1676 (which may be implemented as codes, text, tables, and other data values/structures). This architecture is intended to facilitate use of table-driven elements to augment conventional programming, to provide algorithmic conduits that may be easily configured through control panels and similar user interfaces. Application systems 1404 might be created by end-users of such a device, by the manufacturer of the device, or by service providers, resellers, software vendors, or other third parties.

The illustrated application components 1664, 1666, 1674, and 1676 each list major software and rules subcomponents that might comprise the subsystems 1662 and 1672. Details of a particular application and user environment could be chosen to suit usage requirements. In this example, most retailers might share a common gift card application, utilizing minimal site-specific customization. In addition, some retailers might implement unusual table modification or software programming to meet special needs. Those skilled in the art will recognize that the various example components listed in FIG. 16 (such as, under core application software 1664, scanner traffic monitor, printer traffic monitor, network service gateway, etc.) correspond to major functional requirements implied by the overall data flow of FIG. 9A. In other words, these examples comprise logical functional units of an example application that has been designed a) to read input from the scanner and POS print streams, b) to pass normal UPC items directly to the POS system, and c) to intercept gift card scans for network processing and submittal. Other designs are possible.

In this embodiment, the MCH1 core conduit framework 1402 (described in more detail below) has been designed to facilitate implementation and use of application systems 1404. A software developer creating a new custom application 1656 or configuring a pre-existing application system 1652 and 1654 might choose from many familiar administration and programming methods to achieve a desired behavior, from which much expected technical work may be eliminated. (By analogy, deploying application systems 1404 is intended to be comparable with using website framework tools such as phpBB, CakePHP or Symfony.) For those users who must go beyond the built-in applications, design patterns, and tools, the goal is to facilitate rapid, simple implementation with minimal programming. Overall, this embodiment seeks to simplify the scope and complexity of system integration, through conduit-oriented development and configuration tools.

FIGS. 15 and 16 thus illustrate an example message conduit hub system 906 suitable for use with the system illustrated in FIG. 9A, comprising: a) hardware components 1502, which in this example utilize a commercial SBC platform equipped with standard interface components and appropriate operating system and other software; b) customized and transient components 636, 638, 1404, and 1522 that are specific to a particular application, user, device, etc.; and c) a core conduit framework 1402 that enables algorithmic conduits, and that provides a common operating framework for the applications 1404.

Returning to the three-tier alternative described in FIG. 10B, such a system might superficially resemble the inventive message conduit hub 906 (with respect to its choice of hardware and operating system); but without the benefits of algorithmic conduits, such a system would be very difficult to build, and the result would be functionally deficient. Building a three-tier gift card system by "brute force" would require laborious construction with traditional tools and methods. Without the functionality of the core conduit framework 1402 and its management of state details 638 and conduit rules 636, such a system would lack appropriate building blocks for building a data flow application, and would necessarily be limited in scope and difficult to adapt.

Core Conduit Framework

Proceeding to FIG. 17, the core conduit framework 1402 of FIG. 15 is considered in greater detail, with particular focus on the conduit system software 1534. These components provide the basic algorithmic conduit mechanisms that support data flow systems such as the retail application illustrated in FIG. 9A. In this embodiment, the core conduit framework 1402 is assigned most of the "hard work," which is a separation of function that is effective for an embodiment of the present invention (but is not the only possible design). A different but comparable conduit framework might support: a) other system versions (e.g. a software-only platform suitable for the system in FIGS. 13 and 14); b) other applications (e.g. barcoded bill payment or other electronic monetary transactions); c) other users (e.g. a different retailer or a network processor); or d) other divisions of function.

For clarity, FIG. 17 illustrates a robust, multi-platform implementation of a core conduit framework 1402, one which comprises a wide range of features and functions, and which could be adapted for a range of platforms and uses. Some engineers might construct a conduit framework with a particular target system in mind, using only essential features. Other engineers might construct a conduit framework capable of supporting many different system configurations, from low-cost appliances to large server systems, through the use of selective features enabled or disabled during setup or at runtime (as with operating systems like Linux). For the purposes of this discussion, a selective feature implementation is assumed. When configuring this embodiment for the SBC-based system shown in FIG. 15, a limited feature set might be chosen, suppressing components listed below as "optional" to improve performance. More or all of the features shown in FIG. 17 might be incorporated on other platforms, such as: a) a standard mid-level SBC product (such as, in 2008, the Arcom TITAN or Technologic TS-7800), b) a conventional rack-mounted, tower, or desktop computer system, c) custom hardware; or d) within a conventional general purpose computer, operating system, application, or network service platform. On a particular platform, inclusion of a given feature would depend on such factors as application requirements, storage space, and performance.

Over time, well-known price/performance trends can be expected to continue improving both functionality and generality. Features that seem superfluous in 2010 might be expected in 2015. Moreover, the advantages of algorithmic conduit management may be greatest in complex, large-scale environments, such as in virtualized server farms, rendering pipelines, and supercomputers, where distributed dataflow logic can be difficult to define or control. Therefore, the following embodiment description comprises a broad range of elements, including optional features that might be omitted or simplified on constrained platforms.

It should be stressed that the core conduit framework 1402 described here is but one of many design approaches that might be used to create embodiments of the present invention. Moreover, for clarity, the embodiments described here have been designed to deliver their broad functionality via a straightforward implementation. In some circumstances, it might be desirable to alter such designs, such as to optimize throughput, cost, security, power consumption, size, or other factors. Such designs might deliberately and reasonably omit, consolidate, subdivide, or obscure the functions described here.

The core conduit framework 1402 of FIG. 17 is intended to support the application system(s) 1404 that tailor a solution for a particular purpose or situation (such as the gift card payment system and retailer locations illustrated in FIG. 9A). These systems 1404 primarily access the conduit system software 1534 through an API (application program interface) 1704, through shared state 638 and conduit rules 636 (see FIG. 15), and through other shared data 1522, 1536, 1706, and 1708.

In this embodiment, two important conduit framework components comprise an operating system interface 1722 and the master event manager 1724. These and the major subsystems may have an API (e.g. 1726) analogous to the overall conduit system software API 1704, for program-to-program services within the system. The arrows in FIG. 17 indicate the principal control and data flow relationships, but API call relationships within and between subsystems may also exist among other components.

The conduit framework 1402 is intended to provide access to and control over state and other shared data 1522, 1536, 1706, and 1708. These elements may span temporary and persistent storage, and are intended to create the "personality" for a particular unit, via such elements as inventories of conduit rules, conduits, connected peripheral devices, a unique system identifier, and startup parameters that govern power-up and recovery processes.

The conduit system software 1534 may comprise a variety of core and optional software components, described below, which may be present or omitted from any particular embodiment or installation. Moreover, these components may be architected in numerous ways, familiar to those skilled in the art, such as via independent or monolithic processes, via dynamic or static library routines, via methods in object-oriented class definitions, via message-passing actors, via rule sets evaluated at runtime, etc. Similarly, an implementation may utilize a combination of programming languages, which may in turn be compiled or interpreted, procedural or nonprocedural, high- or low-level, etc. Such architecture and language choices are not critical to this invention, and might depend on such factors as platform details (operating system, processor speed, available memory, etc.), the complexity of expected application systems 1404, and personal preference. A particular hardware and operating system platform will generally offer many good, equivalent architecture and language choices.

For various embodiments (including both the "robust" embodiment illustrated in FIG. 17 and a simpler configuration that might suppress some of these features for use in FIG. 9A), we might utilize a typical Linux tool chain to implement a series of programs in the C and/or C++ programming languages, where these programs execute as a combination of independent processes/threads, static library routines, and/or dynamic library routines, and where they utilize standard interprocess communication methods, all proven technologies for communications programming and embedded systems. Other choices could produce equivalent results. A group of embodiments using the same software base might use compiler switches or installation parameters to suppress optional components. A web-hosted installation might utilize PHP, Perl, Python, Java, C, C++, C#, JavaScript, or similar tools.

FIG. 17 groups principal software components comprising the core conduit framework 1402 into the following subsystems: state management 1732, conduit system control 1736, conduit management 1738, application helpers 1742, and enhanced tools 1744. These components may be further linked by shared services as described above, notably a common operating system interface 1722 and a master event manager 1724. These subsystems are described in greater detail below.

This grouping of components into subsystems is descriptive, rather than structural, meaning that components listed together within a given subsystem may not share any particular run-time or other relationship. These descriptions simply classify behavior. Thus, in different cases, a subsystem's components may be mutually-dependent processes, independent peer processes, library routines, etc., with such implementation details being incidental to the functions performed. Moreover, the number and type of elements within each subsystem, the number and type of subsystems, and the functions themselves have all been chosen for descriptive purposes. Other embodiments might utilize more, fewer, or different elements, and other designs might organize the elements differently. The design shown in FIG. 17 addresses a broad range of typical requirements in a systematic way.

The conduit system software 1534 of FIG. 17 may function as follows. a) Most processing may be subject to conduit rules and state data 1522, 1536, 1706, and 1708 that may be managed by the state management subsystem 1732. These rules are intended to respond to external events, such as device input (for example, by reflecting them to the master event manager 1724 via the operating system interface 1722). b) Events may be continuously queued and dispatched for processing, such as via the conduit management subsystem 1738; the conduit rules (see 636 in FIG. 9B) are intended to determine how traffic through each conduit should be handled. c) The conduit rules may control which application actions 1404, application helpers 1742, and enhanced tools 1744 are used to process conduit data and events. d) Application system(s) 1404 may use these same framework services to perform various operations, such as saving temporary state data 1706, changing state management rules 1708 or other system data 1536, or invoking remote services via enhanced tools 1744. e) A series of lower-level components in the conduit system control subsystem 1736 may provide access to the physical hardware.

A simplified embodiment of the present invention, such as a MCH1 platform installed for the system shown in FIG. 9A, might omit or suppress all or part of the enhanced tools 1744 and some of the application helpers 1742, and might also reduce or consolidate the functionality of the remaining subsystems and their components. Larger-scale implementations might augment or subdivide these functions.

In this implementation, all conduit logic is intended to utilize a system "wrapper" provided by: a) an operating system interface 1722 offering simplified mechanisms for such operations as basic execution control, system access, file and file system management, external event handling, and housekeeping services; and b) a master event manager 1724 intended to control and serialize overall data stream and communications processing. Closely related to these two components are a master error handler 1752 and a debug/trace helper 1754, each of which may interact with the system interfaces 1722 and 1724 to provide system-wide logging and testing services, subject for example to state management settings 1522, 1536, 1706, and 1708.

All major framework components may expose callable interfaces (APIs) for controlling the various system elements they manage. In a particular embodiment, API implementation details might utilize various technologies, such as conventional program calls, message passing, or callback/continuation-passing; such choices are not critical to the present invention. In this embodiment, a typical object-oriented implementation may be employed, providing an appropriate set of method, property, and event definitions that provide access to the associated services. (In a procedural language implementation, e.g. using C language, encapsulation and marshalling might provide an equivalent abstract interface.) In addition to API-level access, many of the framework components (e.g. 1732, 1738, and 1742) may also have direct data flow relationships, such as by utilizing shared data 1522, 1536, 1706, and 1708 to manage such well-known constructs as queues, semaphores, stacks, or heaps.

The state management subsystem 1732 of FIG. 17 may comprise lower-level components that use the operating system interface 1722 to manage shared system data and rules 1522, 1536, 1706, and 1708, comprising for example: a) persistent storage manager, which may control the use of static memory (static RAM, disk storage, memory card, etc.) for data 1522, 1536, and 1708 that remain unchanged across system power cycles (in this embodiment, by writing to Flash RAM storage), and which may comprise software, rules, static data, and other system details; b) configuration manager, which may manage temporary state data 1706, system details 1522, and operating system interface elements 1722 pertaining to such elements as physical connectivity, locale, system clock, and other aspects of the global execution environment; c) conduit rules manager, which may administer parameters and other data 1536 and 1708 that control the behavior of conduit management 1738, application system(s) 1404, and various application helpers 1742 and 1744; d) application manager, which may manage the available application system(s) 1404; and e) application state manager, which may provide tools for application system(s) 1404 to read and write various state data 1522, 1536, 1706, and 1708. These components may also expose callable interfaces (via an API) for controlling system state. Additional state management 1732 components, not shown, could extend the range and type of state services, such as checkpoint/rollback, a journaling file system, service level monitor/guarantee, or private/public key management.

The conduit system control subsystem 1736 may comprise lower-level components that use the operating system interface 1722 to manage the hardware and execution environments, comprising for example: a) startup manager, which may initialize the framework 1402 and launch the application(s) 1404, based on startup rules and other system details 1522, 1536, and 1708; b) recovery manager, which may detect and resolve incomplete processing, such as pending transaction submittals, that may remain after an unexpected system restart; c) firmware reload, which may update the system software via downloaded content or peripheral device input; d) integrity test, a built-in self-test which may detect, report, and if possible resolve various kinds of system problems and inconsistencies; and e) input/output helpers, which may provide a simplified interface for accessing external data sources and destinations (and which in particular may provide a virtualized stream interface that hides system control operations, and may unify access to individual USB, Ethernet, and other endpoints). These components may also expose callable interfaces (via an API) for system control. Additional conduit system control 1736 components, not shown, could provide virtualized interfaces to other hardware features, such as power management, fail-over components, a system console interface, telemetry devices, or communications devices such as modems or GPS radios.

The conduit management subsystem 1738 may comprise mid-level components that primarily interact with the master event manager 1724 to respond to input events (in accordance with shared system data and rules 1522, 1536, 1706, and 1708), comprising for example: a) connection manager, which may control access to physical and logical endpoints associated with input/output devices; b) conduit manager, which may manage the relationships between pairs or groups of connections; and c) master traffic manager, which may manage the relationships among the conduits, and may coordinate overall data flow through the conduits. These components may also expose callable interfaces (via an API) for controlling the conduits. Additional conduit management 1738 components, not shown, could extend the range and type of conduit services, such as data logging, timestamping, conduit-level security, or traffic analysis.

The application helpers subsystem 1742 may comprise various mid- and higher-level components that are either invoked by the conduit management subsystem 1738 or by application system(s) 1404 (perhaps under control of stored rules and data 1522, 1536, 1706, and 1708), comprising for example: a) pass-through manager, which may implement "pass-through conduit" behavior (see the heading "modes of operation"); b) transformation manager, which may implement "transformation conduit" behavior, utilizing appropriate mechanisms such as other application helpers 1742, application actions 1404, or enhanced tools 1744; c) pattern matcher, which may provide a built-in transformation engine for detecting and optionally replacing data stream elements utilizing regular expression pattern matching and related techniques; d) various stream helpers (possibly including a scanner helper, printer helper, and network helper), which may automate housekeeping and management functions associated with using these devices as stream endpoints; e) an XML/YAML helper, which may automate aspects of XML and YAML data stream processing; and f) a barcode signature manager, which may implement the special "algorithmic signature" logic required to implement barcoded payment processing as taught by Meyer, U.S. Pat. No. 6,993,507. These components may also expose callable interfaces (via an API) for invoking and controlling the helper functions. Additional application helper 1742 components, not shown, could extend the range and type of helper services, such as support for additional device types, automated language translation (e.g. between English and Spanish), symbology translation, content analysis, or natural language processing.

The enhanced tools subsystem 1744 may comprise various mid- and higher-level components, any or all of which might be omitted or suppressed in a simplified or special-purpose implementation (such as might be used for the system in FIG. 9A). These components may otherwise resemble the application helpers 1742, and comprise for example: a) a browser helper, which may facilitate browser-related messaging interfaces as might be used in AJAX or web mash-up applications;

b) an Atom/RSS helper, which may assist in automated news feed processing; c) a local database manager, which may provide tools for managing lookup tables, pending transactions, and other structured data used in local processing; d) a remote data gateway, which may encapsulate access to remote data resources such as database servers, web servers, or FTP servers; e) a store/forward manager, which may automate the temporary storage and asynchronous transmission of pending transactions (possibly including an interface to the recovery manager component of the conduit system control subsystem 1736, to ensure that pending transactions are not lost after a system failure); f) a dialogue manager, which may facilitate the management of request/response interactions with remote resources (and possibly to transform results into stream-oriented data as appropriate), as well as possibly to support use of client computing elements (such as AJAX widgets) that may be needed to interact with individual or multiple remote systems; g) a Web Services (WDSL/XML) helper, which may automate aspects of access to standard Web Service interfaces via the dialogue manager; h) a timestamp serializer, which may facilitate the generation of unique transaction IDs and timestamps during transaction processing; i) a mini web server host (or a full web server such as Apache), which may provide a browser interface for accessing the system remotely, for administration, for bridging to remote systems, or for other purposes; j) a mini Web Services host (or a full Web Services implementation such as Apache Axis), which may provide a standard Web Services interface to the system via such technologies as SOAP, XML, and WSDL; k) a GUI configuration tool, which may provide an end-user "control panel" interface to the system, via either the browser interface (described above, and illustrated in FIG. 18), an operating system windowing interface, a console interface, or an alternative user interface mechanism; and l) a security manager, which may provide integrated security services for the system, possibly in conjunction with operating system security components such as Kerberos. These components may also expose callable interfaces (via an API) for invoking and controlling the enhanced tools. In a given implementation, the choice to include or omit any such tool could be determined based on application requirements, hardware details, and similar considerations, as required for example to optimize storage consumption, processing overhead, device cost, and the like. Additional enhanced tool 1744 components, not shown, could extend the range and type of services, such as providing messaging interfaces to network service vendors, database systems, or other software products.

Many options and alternatives exist for implementing the core conduit framework 1402 and the other functionality described above. The separate programs and processes listed here may be combined, subdivided, reorganized, or connected differently, as a matter of technical convenience or personal preference, without causing substantive changes in essential system behavior.

As a practical matter, the many possible approaches may be grouped in categories as follows: a) dedicated, special-purpose embodiments of the present invention, intended to provide a particular set of optimized conduit management capabilities within the constraints of low-cost or specialized hardware, as illustrated in FIG. 13; b) dedicated, general-purpose embodiments of the present invention, intended to provide many or most of the features described here, and utilizing a dedicated platform such as a mid-cost SBC (single-board computer), as illustrated in FIG. 9A; c) shared, special-purpose embodiments of the present invention, intended to add certain conduit management capabilities to a shared computer platform that supports other applications (such as point of sale, inventory management, financial processing, or general data processing); and d) shared, general-purpose embodiments of the present invention, intended to add many or most of the features described here to a shared computer platform that supports other applications, as illustrated in FIG. 12A. For clarity, the descriptions here have focused on dedicated, general-purpose implementations, i.e., the second category listed above; but depending on circumstances, a shared or special-purpose embodiment may be a more suitable choice.

Implementation techniques appropriate for the various platforms envisioned are well known in the art, and involve the use of standard software engineering techniques, tool chains, and tools (editors, compilers, cross-compilers, linkers, loaders, debuggers, etc.).

Modes of Operation

This section provides a brief overview of the principal modes of operation and use of an algorithmic conduit as implemented in an embodiment of the present invention. For convenience, this description refers to conduit elements from FIG. 9B (i.e., a scanner 804, printer 854, and point of sale system 808) which have been connected to an inventive message conduit hub 906. In use, messages might traverse a protocol stack involving many hardware and software layers, both outside and inside the device 906 and its conduit logic 634. This description ignores those communications features, and focuses on the behavior of the algorithmic conduit itself, as configured for various modes of operation.

A basic form of algorithmic conduit is a "pass-through conduit," where data is read from a source and sent without modification to a destination. In FIG. 9B, if a pass-through conduit connected the scanner 804 with the POS system 808, then data would flow directly from the source 804 through the conduit hub 906 to the destination 808.

For convenience, most examples in the present invention consider streams of character data, as commonly used with serial devices and as processed by UNIX-style "pipes." Such a character stream might originate from or terminate at, for example: a) a specific hardware device, accessed through a combination of technical elements supported by the implementation platform (such as a scanner or printer accessed via USB hardware and software); or b) a virtualized, encapsulated, or composite stream interface, under software control (such as an image scanner/OCR application that produces text output). Numerous other techniques might be supported by this broad concept of data stream, such as request/response dialogues, property lists, object- or message-oriented interfaces, or relational database access. In particular, web-based services provide complex messaging interfaces, which nevertheless may be treated (via suitable encapsulation) as virtualized data streams. Regardless of data representation, lower levels of the protocol stack might use a variety of technologies, such as unidirectional or bidirectional links, peer-to-peer or master/slave protocols, error correction, compression, or routing. As with hardware and software platform details, such matters are implementation decisions with respect to the present invention.

The pass-through operation just described is comparable to the use of a conventional hub, router, cable, or similar means for connecting two devices. By analogy, using an embodiment of the present invention to create a pass-through conduit may be thought of as a stand-alone realization of a Linux/UNIX "pipeline" connecting two endpoints, in which the conduit logic 634 and conduit rules 636 determine the topology.

Continuing with the next mode of operation, consider a "transformation conduit," which is a refinement of a pass-through conduit (as described above) that modifies the data stream as it passes from a source to a destination. In FIG. 9B, if a transformation conduit connected the scanner 804 with the POS system 808, then data would be tested in transit, and might be altered before delivery, in accordance with conduit rules 636 and conduit logic 634. This form of operation is comparable to the behavior of automated conversion mechanisms, such as protocol emulators, address translators, translation systems, and many device drivers. By analogy, using an embodiment of the present invention to create a single stream transformation conduit may be thought of as a stand-alone realization of a Linux/UNIX "pipeline" containing a filter, in which the conduit rules 636 and conduit logic 634 determine both the connection topology and the transformation algorithm. A variety of techniques could be used to specify rules to implement such algorithms (discussed in more detail below). In general, conventional programming methods provide many options for specifying character stream transformation logic, using such software engineering techniques as regular expression pattern matching, state machines, stateless transformation rules, lexical analyzers, parsers, and formal grammars. An embodiment of the present invention provides a convenient platform for using and configuring such processing, and thus might be a good choice for transformation applications such as device emulation, data cleaning, context-sensitive filtering, automated format conversion, or pipelined implementations of string processing applications.

(Contrast the use of a transformation conduit using an embodiment of the present invention with a traditional programming solution in a conventional computer environment; for example, consider automated translation between character sets. A programmer might write a filter program to perform such a transformation; but what then? Faced with a one-time need, a user might invoke such a program explicitly, via a command or startup script that identifies the input file or data stream, interposes the filter program, and redirects output as desired. However, the user would have no convenient framework for installing such a filter for ongoing use.)

Figure 5D:
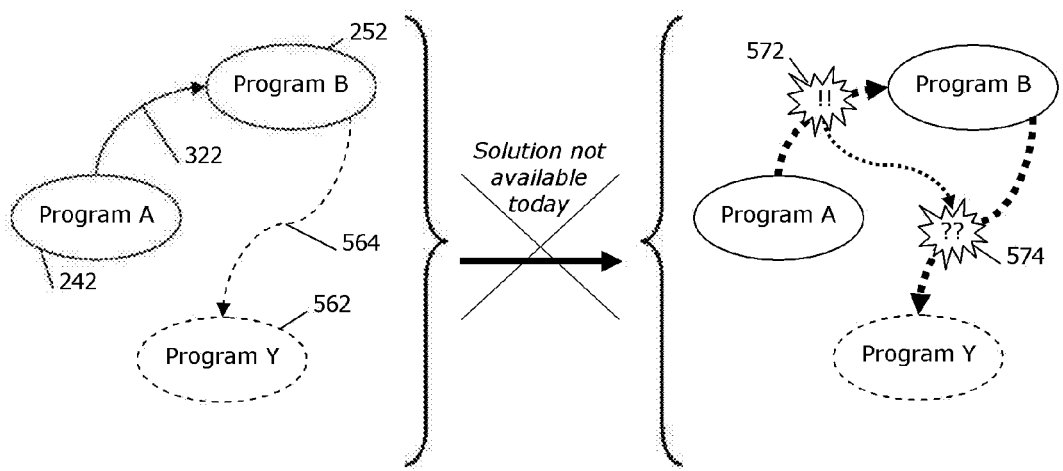
FIG. 5D shows how the art presumes that application knowledge resides in programs and not in the connections between programs.

Continuing with the next mode of operation, consider a "multi-stream transformation conduit." Unlike the pass-through and transformation conduits described above, altered data from two or more data sources would be used to feed corresponding data destinations. Typically, each such destination would receive modified data, based primarily (but not exclusively) on its respective source. In FIG. 9B, if a multiple-stream transformation conduit connected the scanner 804, POS system 808, and printer 854, then conduit logic 634, state details 638, and conduit rules 636 could together control how messages move. The conduit rules 636 might consider elements from a primary data source 804, from state details 638 (such as the contents of earlier messages), and from a secondary data source 808. The description of gift card processing in FIG. 9B illustrates multiple-stream transformation. This form of operation is comparable to the behavior of certain test and process control equipment, which are capable of monitoring and correlating multiple telemetry streams. Such equipment is generally designed to meet a particular need, rather than offering a general-purpose solution (as could be enabled by embodiments of the present invention). By analogy, using an embodiment of the present invention to create a multiple-stream transformation conduit may be thought of as a stand-alone realization of such concepts as a data flow graph, of a multi-source pipeline under CMS Pipelines, or of a custom software program that correlates multiple input streams. As in the preceding example, the conduit logic 634 and conduit rules 636 determine both the connection topology and the transformation algorithm. A variety of techniques could be used to specify such algorithms (discussed in more detail below). In general, conventional programming methods provide many options for specifying logic for correlation and transformation of data streams. With respect to creating specific one-off applications, programming multiple-stream correlation involves standard software engineering problems; but with respect to creating generic solutions, programming multiple-stream correlation has been a computer science research topic, leading to multi-source data management user interfaces and specification languages. Such research has focused on how to create logic within a single program or system that performs such operations, as opposed to the concept of active connections between systems (such as described in FIGS. 5C and 5D). Regardless of research trends, most practitioners deal with stream correlation problems on an ad hoc basis. An inventive message conduit hub as described herein offers a convenient platform for using, configuring, and researching correlation processing, and thus might be a good choice for multi-stream applications such as multimedia presentation and monitoring, system integration, legacy system support, and experimentation.

Continuing with the next mode of operation, consider a "multi-stream transformation conduit with side-effects." Altered data from two or more data sources feed corresponding destinations, as described above for multi-stream transformation conduits. However, the logic 634 and conduit rules 636 may cause additional "third party" actions, such as recording data, or transferring data to additional data destinations for monitoring, reporting, independent transaction processing, or other uses. Such outputs are often referred to as "side effects" relative to the primary data streams. The description of gift card processing in FIG. 9B illustrates multiple-stream transformation with side-effects, where transactions are sent to a processing network 882. The interface to a processing network 882 would typically utilize a bidirectional dialogue, rather then unidirectional stream output. Typical network interfaces might use a Web Services host or a database server, and thus might involve transmission of SQL statements, FTP commands, or requests specified with XML, WSDL, or YAML, and could involve handling of responses and errors. Such operations might involve interacting with multiple systems (commonly referred to as mash-ups) via an encapsulating interface, and which might thus be much more complex than simply sending a stream of data. Regardless of technology, conduit logic 634 and conduit rules 636 could be used to virtualize such a dialogue in a convenient way for data stream processing.

The addition of side-effects to a multiple-stream transformation conduit enables a broad range of applications involving multi-system access, integration, and coordination. By analogy, using an embodiment of the present invention to create a multiple-stream transformation conduit with side-effects may be thought of as a stand-alone realization of rich client-side logic or "widgets" in a client-server or three-tier application. Using conventional programming methods, such components are typically only created for specific applications. An inventive message conduit hub as described herein provides a convenient platform for using, configuring, and generalizing such processing, and thus might be a good choice for stateful multi-stream applications, as used in "cloud computing" and web-hosted solutions.

User Interfaces

An embodiment of the present invention may include or exclude a user interface for configuration, monitoring, or other purposes. Returning to the embodiment illustrated in FIG. 17, enhanced tools 1744 are described that incorporate user interface elements for common administrative and testing uses. For example, typical user control actions might support such operations as: a) specifying IP addresses and subnet masks; b) enabling or disabling specific devices, conduits, or conduit rules, e.g. by setting options interactively or by downloading control files; c) installing new firmware, either from a local device or via a network connection; or d) setting locale, system time, and similar details.

In another embodiment, a more comprehensive user interface than suggested in FIG. 17 might add tools for creating and editing the various conduit rules, data, and software that pertain to transformation logic, Web Services gateways, database access parameters, data distribution schedules, and other more advanced aspects of system behavior. An even more sophisticated user interface might include a graphic "control panel" analogous to those used for process control systems, in which the various connections, tests, filters, feedback conditions, and other elements that manage the algorithmic conduits are represented and controlled visually.

Figure 18:
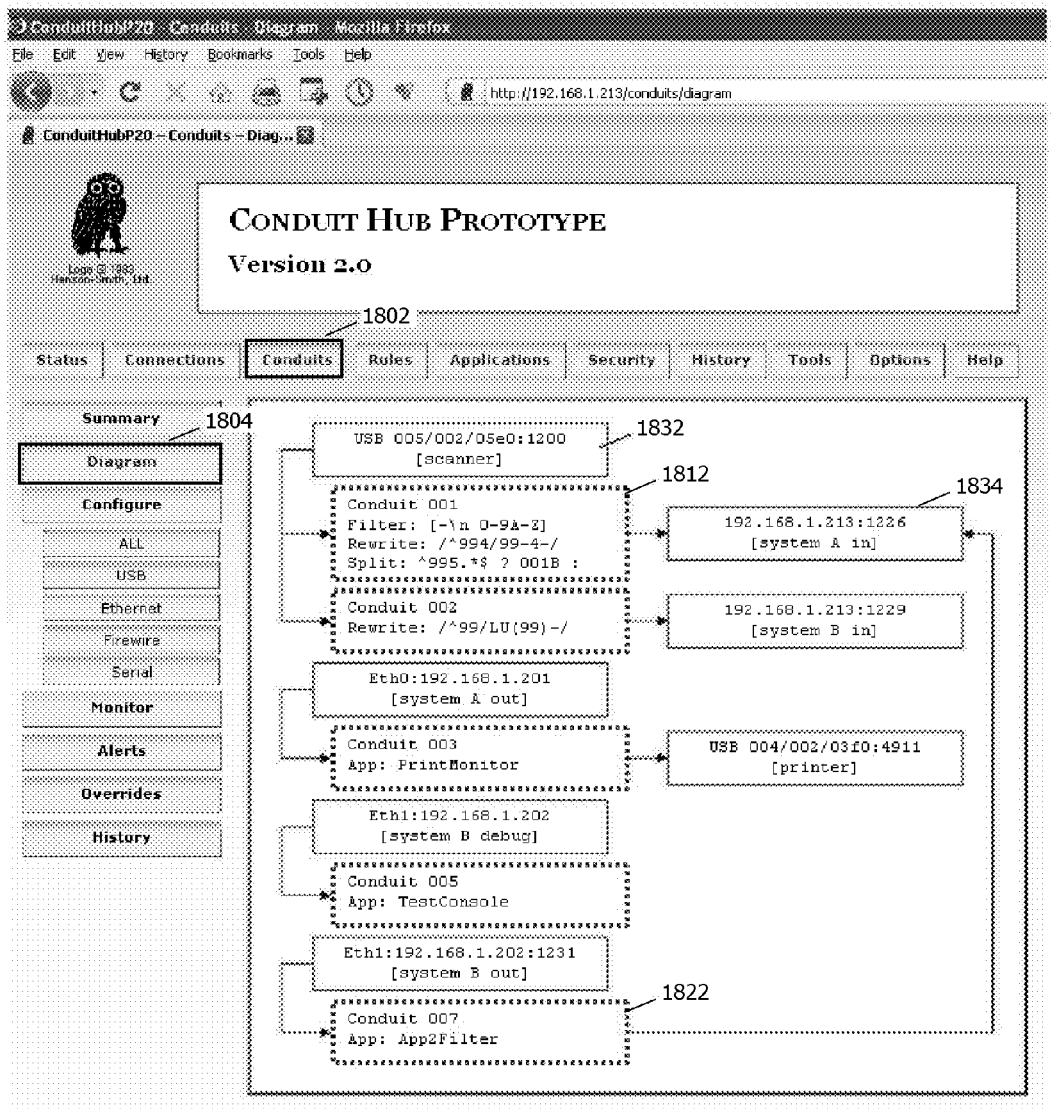
FIG. 18 is an exemplary control panel interface, suitable for the embodiment in FIG. 9A, using a diagram to display the active algorithmic conduit configuration.

Proceeding to FIG. 18, an embodiment of the present invention might include a browser-based user interface for configuring the system and its operation. In this example, a client workstation utilizes a conventional web page to control a system like that used in FIG. 9A, and as described above in FIGS. 15-17. The example web page 1808 might present or control diverse aspects of the system and its operation, with features accessed using familiar web page navigation buttons 18 02 and 1804. The navigation buttons shown (for example, Status, Connections, Conduits, Rules, Applications, Security, History, etc.) could correspond to the device's major operational concepts and features.

The example web page of FIG. 18 has its Conduits and Diagram buttons selected, and shows an exemplary graphic diagram showing the device's active conduit configuration. In this example, the system's conduits have been laid out in a network chart, showing identifiers, connection details (e.g. IP addresses or URLs), descriptive information, and actions to be performed (such as filters, rewrite rules, split/tee operations, or use of application programs). Arrows on the diagram might indicate conduits 1812 and 1822 that connect endpoints 1832 and 1835. In this example, one data source 1832 is shown to be split into two conduits, and one data destination 1834 is shown to receive data from two conduits.

Conduit Rules

This section reviews aspects of how transformation and other rules may be encoded for processing within conduit logic. Conduit rules are intended to be clear, explicit, and easily-modifiable, and may refer to data en route, state details, the contents of multiple data streams, stored rules, and other system aspects. Conduit rules might be represented using, for example, setup files or tables similar to those that control a firewall, using interactive control settings via graphic or other user interfaces, or using source code written in some general purpose or specialized programming language (and which in turn may use API calls or language primitives to control algorithmic conduits).

Returning to the embodiment illustrated in FIG. 17, an example set of conduit rules might involve the conduit management 1738 and application helpers 1742 subsystems, via state and rules definitions 1522, 1536, 1706, and 1708 populated from a control file defining each active conduit. This file might specify one or more conduit actions to take when input arrives, specified in teens of a conduit action names (possibly corresponding to entries in the application helper 1742 API) plus parameters to control the action. For example, a pass-through conduit rule might specify the action "Send *" (i.e., "send all data to the conduit endpoint"). A simple transformation conduit rule might use the two actions "Replace /fox/ renard/; Send *" (i.e., "replace one value with another, then send the result to the conduit endpoint"). In addition to use of generic actions, such as via application helpers, a conduit rule might also reference a particular application, such as the gift card application 1652 (possibly corresponding to an entry in the application's 1404 API), such as the action "DetectBarcode *" (i.e., "pass the message to the named application entry point"). The actions available for use in rules might in turn correspond to entries managed by the state management subsystem 1732, via its application manager component. The example conduit actions cited above would interpret their parameters in appropriate ways; for example, the "Replace" action might accept arguments containing a standard "regular expressions" pattern matching string. This embodiment might utilize standard Linux syntax, commands, filters, and library routines to support many basic transformations.

FIG. 17 lists to several possible application helpers 1742 and enhanced tools 1744 that could simplify the creation of conduit rules by eliminating the need to write application programs. For example, the scanner helper might decode a variety of common scanner control codes and barcode symbologies, and normalize the result in a canonical representation. (This process is sometimes termed "pickling," with a tool like the scanner helper termed a "pickler.")

Nonprocedural table entries, simple action statements, and similar techniques could help eliminate programming from a wide range of conduit rules, reserving application software 1404 for unique or complex processing. Such software: a) may be made available as conduit actions, as described above, for use via (nonprocedural) configuration-based conduit rules; b) may implement any choice of parameters or syntax; c) may utilize any programming techniques and other tools supported by the platform; and d) may interact with the other system components via the many available APIs. Thus an embodiment of the present invention could simultaneously: reduce the need for custom programming; simplify the creation of any custom programs that might be needed; and increase the utility of such custom programs, by making their services available through nonprocedural rules.

Proceeding to FIG. 19, an example control file is shown with a possible set of conduit rules. Such a file might be processed during system startup, to establish and configure algorithmic conduits, connections, and other operating elements. In this example, a simple configuration language is utilized, designed for representing conduit rules via YAML syntax. Some details have been removed for clarity. The file might begin with an identification section 1902 comprising such details as serial number 1904. Next, a series of connections might be defined 1906, comprising for example a series of USB links 1908 to a scanner 1910 and printer 1912, and Ethernet links 1916 to the point of sale (POS) system 1918 and other destinations. A list of applications 1920 might comprise actions for reference later in the conduit rules, such as sending a network transaction 1922. State variables 1924 might also be provided, possibly with names 1926 and 1928 for reference in the conduit rules.

The algorithmic conduits 1932 might each be named 1934 and assigned values comprising a source 1936, destination 1938, and actions 1942. For example, scanner traffic might be diverted 1944 to a network processor 1946 when a certain filter test 1948 is passed. If the diversion occurs, then the data might be formatted and transmitted 1952; otherwise the data could be passed to the POS 1954. (Source and destination references might be to external devices or streams, internal actions or streams, state data, and other system elements.)

A similar algorithmic conduit 1960 might route traffic from the network processor 1962 to an application 1922 and 1964, which might process the transaction reply 1966. Likewise, another conduit 1970 might handle the application output and record necessary state data 1972 and 1974 for later use. This data might get referenced when the POS sends text to the printer 1976, which could be tested for a match against the state information 1980 and 1982, and possibly used to drive output formatting 1984.

Superficially, this specification may seem to resemble a program; but its main function is to control the behavior of algorithmic conduits, rather than to define an endpoint program. It is primarily comprises nonprocedural definitions of conduit rules.

FIGS. 20A and 20B provide further context, by illustrating how traditional programs might create data streams implicitly. Proceeding to FIG. 20A, a data stream command might be typed on Linux, UNIX, or many Windows systems. Such commands will be familiar to most programmers. This example command would filter and sort a list of values, by creating a "pipeline" of commands 2002 to operate in sequence. Each element is shown to be separated by a vertical bar 2004, which "pipes" the output of the left-hand command as input to the right-hand command. (Thus the 'grep' command 2006, which searches for string matches, sends its matched output values to the 'sort' command 2008.) This entire command line creates a conduit; but the conduit is merely an artifact of having typed the command. The conduit does not persist, and it has no properties other than passing the output of one command as the input to another.

Proceeding to FIG. 20B, the same logic of FIG. 20A could be implemented in a C-language program 2022. In this example, the inputs, outputs, and tests have been explicitly coded 2032, 2034, 2036, and 2038; all data flow is internal to the program. Although the output is the same as the example of FIG. 20A, there are no conduits created, other than the program's stream input and output, which the operating system links to the files that are specified by name 2032 and 2034 within the program. The programmer of this example has used traditional computation methods, rather than data flow logic, to create the program, partly because the C language does not provide convenient building blocks for expressing pipeline operations. In a larger application, the programmer might write a system of programs that create several separate processes or threads, and which exchange messages using pipes, sockets, or similar mechanisms. However, the individual programs would create and refer to any such elements using traditional system calls, specifying all details of message interface, format, protocol, etc. Exchanging messages with an external system would be even more complex.

Alternative Embodiments

Consider an embodiment of the present invention such as the one used in FIG. 9A, which in that example has been configured to support gift card transaction processing. By using simple configuration steps, such as changing table entries or web page settings, this same embodiment could support many other uses. With the addition of limited software programming, to create application components that utilize algorithmic conduits as building blocks, a much broader range of low-cost uses would be possible. For example, such a system could easily be configured to process transactions involving credit cards, debit cards, prepaid cash cards, smart cards, bank account transactions such as deposits and the replenishment of Internet wallets, and other forms of electronic monetary transactions. Similarly, such a system might be configured to process non-financial transactions, such as those related to library books, equipment inventory, airline tickets, or car rentals. Similarly, such a system might be configured to process non-transactional streams, such as parametric control in process control systems, device control systems (e.g. for flight or vehicle control), music reproduction, musical instrument behavior, or robot behavior.

In particular, an embodiment of the present invention similar to that shown in FIG. 9A could be used to implement barcoded bill payment transactions at retail, utilizing a barcoded algorithmic "signature" as taught by Meyer in U.S. Pat. No. 6,993,507. The traditional method for implementing such a system would be through costly modification of the POS system and other retailer systems, analogous to FIG. 8A. However, by using an approach very like that of FIG. 9A (after replacing the network processor 882 with a different service provider capable of processing third party bill payments), the same conduit hub 906 could be configured to intercept bill payment barcodes and submit them for payment. Conduit management, receipt printing, and other aspects of FIG. 9A could remain the same.

The computer industry currently offers a wide array of standard technologies suitable for implementing embodiments of the present invention. In future, that diversity is likely to grow. Specific computer models, hardware components, device interfaces, messaging interfaces, protocols, standards, and other elements cited herein have been chosen to illustrate implementation options, without restriction. For example, embodiments of the present invention might utilize such elements as: a) logic implemented via such technologies as discrete components, SoCs (system on a chip devices), ASICs (application-specific integrated circuits), FPGA (field-programmable gate array), DSPs (digital signal processors), motes ("smart dust"), SBCs (single-board computers), RISC processors, SIMD or MIMD processors, microprogrammed controllers, microprocessors (e.g. well-known products from such manufacturers as AMD, ARM Limited, Cyrix, IBM, Intel, Sun, or TI, whether single-core, multicore, or massively multicore), microcomputers, embedded systems, handheld computers, minicomputers, mainframe computers, or via any of the other communications and data processing platforms and architectures known in the art; b) logic shared or managed via networks, clusters, multiprocessor systems, blade servers, resource virtualization, system virtualization, client/server configuration, or three-/multi-tier configuration (and via the use of such configurations when installed in a single device, when co-located at a single site, or when located at different sites), or via other architectures known in the art for utilizing multiple processors or systems, or via a monolithic system; c) system control via such technologies as a standard commercial or open source operating system (e.g. Linux, UNIX, Microsoft Windows, Apple OS/X, QNX, z/VM, FreeDOS, or VxWorks), via virtualization technologies (e.g. Jail, KVM, QEMU, TRANGO, Virtual Iron, VMWare, Xen, or z/VM), via a specialized control system (e.g. using control loop, interrupt-driven, preemptive or cooperative multitasking, microkernel, exokernel, monolithic, real-time, reflective, virtualized, or other architecture elements), via other control hardware or software tailored or embedded for a specific purpose, or via similar methods known in the art; d) data stored via primary memory (RAM, ROM, flash memory, and their variants), secondary storage (RAM disks, fixed disk drives, optical drives, and their variants), auxiliary or tertiary storage (SD cards, USB drives, tape drives, and related technologies), via other data storage mechanisms tailored or embedded for a specific purpose, or via similar methods known in the art; e) data managed via such technologies as standard commercial or open source database managers (e.g. Oracle, MySQL, Microsoft SQL Server, Informix, DB/2, or Microsoft Access), via other standard data management tools (e.g. file managers, dictionaries, hash systems, index managers, or other file system components), via object-relational mapping (ORM) software (e.g. Doctrine or Propel), via other data management hardware, software, or algorithms tailored or embedded for a specific purpose, or via similar methods known in the art (including the absence of such elements); f) connection to such devices as printers, scanners, modems, receivers, transmitters, telephones, cell phones, telephony equipment, video adapters, telemetry or other sensors, keyboards, docking stations, cameras, microphones, musical instruments, audio devices, video devices, personal digital assistants (PDAs) or similar handheld devices, Ethernet or Internet devices (e.g. hubs, routers, bridges, switches, firewalls, DSLAMs, or servers), point-of-sale (POS) systems, other general-purpose or specialized computer systems, or other devices or systems known in the art that might participate in a message conduit environment; g) communications supported via such technologies as a complete or partial standard hardware/software protocol stack (e.g. Ethernet protocol suite, OSI protocol suite, or X.25 protocol suite), via individual hardware, software, or messaging components (e.g. TCP, UDP, IPv4, IPv6, FDDI, ATM, USB, FTP, HTML, WSDL, SOAP, USART, SPI, PC/104, PCI, ISDN, Internet, DSL, Bluetooth, packet radio, spread spectrum, wireless, optical fiber, twisted pair cable, or LAN/WAN technologies), via the use of real-time, batch-oriented, burst-oriented, multiplexed, or other scheduling strategies, via other communications hardware or software tailored or embedded for a specific purpose, or via similar methods known in the art; h) security and access control managed via such mechanisms as one- or n-way data encryption, digital certification, public key encryption, or n-factor authentication, via the application of such security mechanisms at the time data is being input, output, transferred, processed, or stored, via the use of password or PIN number protection, via use of a semiconductor, magnetic or other physical key device, via biometric methods (including fingerprint, nailbed, palm, iris, or retina scanning, handwriting analysis, handprint recognition, voice recognition, or facial imaging), via such measures used singly or in combination (in one or more systems or methods of the disclosure), or via other security measures known in the art; i) user interactions supported via such technologies as Internet browser (e.g. Microsoft Internet Explorer, Firefox, Safari, Opera, or Netscape), GUI interface, console interface, LCD display, keypad, or via other standard or custom means of allowing the control, administration, and use of a device, or via similar methods known in the art (including the absence of such an interface); j) software development via such technologies as standard or proprietary higher-level programming languages (e.g. BASIC, C, C++, C#, command files, Erlang, FORTH, FORTRAN, Java, JavaScript, Lisp, Pascal, Perl, PHP, Prograph, Python, Ruby, Scheme, shell scripts, Smalltalk, Statecharts, UML, or Visual Basic, including any of their numerous variants, descendents, or relatives, and thus including object-oriented, non-object-oriented, structured, unstructured, dataflow, graphical, functional, logic-based, procedural, nonprocedural, and other language types known in the art), via lower-level programming languages (e.g. the assembly languages of specific processors, microprogramming languages, or machine languages as represented in numeric machine instructions), via the platforms used to process such languages (e.g. compilers, just-in-time compilers, cross-compilers, interpreters, emulators, virtual machine environments, or assemblers), via special-purpose languages and related tools tailored for specific purposes, via linkers, loaders, debuggers, source/version control systems, documentation tools, performance aids, or tuning monitors, via other development and testing components tailored or embedded for a specific purpose, or via similar methods and tools known in the art; or k) software configured via such architectural choices as virtualization, multiple processes, multiple threads, distributed processing, shared memory, message passing, dataflow computation, intelligent agents, dynamic libraries, static libraries, monolithic design, or via similar methods known in the art. These elements are provided as examples without restriction.

It is presumed that technology advances will offer suitable improvements and replacements for elements like those listed above. Those skilled in the art should, when implementing an embodiment of the present invention, choose the best and most suitable combination of hardware, software, tools, techniques, and components available at the time—in preference to elements that may have been specified herein by way of example, and in which role are not intended to imply design limitations.

The previous description of the disclosed embodiments is provided to enable a person skilled in the art to make or use the present invention. Various modifications to these embodiments will be readily apparent to those skilled in the art, and the generic principles defined herein may be applied to other embodiments without departing from the spirit or scope of the invention. The present disclosure is intended to cover all such alternatives, modifications, and equivalents, as may be included within the spirit and broad scope of the disclosure. Thus it is intended that the scope of the present invention herein disclosed should not be limited by the particular disclosed embodiment described above, but should be determined only by a fair reading of the claims that follow.

What is claimed is:

1. A method of processing messages, the method comprising:
    defining at least one algorithmic conduit;
    defining at least one conduit rule for controlling at least one algorithmic conduit;
    receiving at least one message; and
    applying said conduit rule.

2. The method of claim 1, further comprising modifying at least one algorithmic conduit.

3. The method of claim 1, further comprising modifying at least one conduit rule.

4. The method of claim 1, further comprising defining at least one other conduit rule that specifies how to modify at least one conduit entity.

5. The method of claim 1, further comprising defining at least one conduit action specifying an operation that could be applied to at least one algorithmic conduit; and defining at least one other conduit rule that references said conduit action.

6. The method of claim 5, further comprising modifying at least one conduit action.

7. The method of claim 6, further comprising defining at least one other conduit action, the other conduit action specifying how to modify at least one conduit entity.

8. The method of claim 1, further comprising maintaining conduit state information, the state information comprising persistent data regarding the algorithmic conduits, the messages, the conduit rules, or the application of the conduit rules; and defining at least one other conduit rule that updates or references the state information.

9. A method of processing messages, the method comprising defining at least one algorithmic conduit; and defining at least one conduit rule capable of controlling the algorithmic conduit.

10. The method of claim 9, further comprising defining at least one conduit rule identifying a source conduit communicator.

11. The method of claim 9, further comprising receiving at least one message and applying the conduit rule.

12. A message conduit hub system, the system comprising hardware and/or software components, the components being configured to operate conduit hub logic, the logic being configured to:
- enable definition of at least one algorithmic conduit;
- enable definition of at least one conduit rule for controlling at least one algorithmic conduit;
- receive at least one message; and
- apply the conduit rule.

13. The system of claim 12, wherein the logic is configured to enable modification of at least one algorithmic conduit.

14. The system of claim 12, wherein the logic is configured to enable modification of at least one conduit rule.

15. The system of claim 12, wherein the logic is configured to enable definition of at least one other conduit rule, the other conduit rule specifying how to modify at least one conduit entity.

16. The system of claim 12, wherein the system is configured to enable definition of at least one conduit action, the action being configured to allow its application to at least one algorithmic conduit; and configured to enable definition of at least one other conduit rule that references said conduit action.

17. The system of claim 16, wherein the system is configured to enable the modification of at least one conduit action.

18. The system of claim 17, wherein the system is configured to enable definition of at least one other conduit action that controls modification of at least one conduit entity.

19. The system of claim 12, wherein the system is configured to manage conduit state information, the state information comprising persistent data regarding the algorithmic conduits, the messages, the conduit rules, or the application of the conduit rules; and further configured to enable creation of at least one other conduit rule, the other conduit rule specifying how to update or reference the state information.

20. The system of claim 12, wherein the system is configured to enable definition of at least one other conduit rule, the other conduit rule comprising instructions for reliable generation of monetary transactions.

21. The system of claim 12, wherein the system is configured to enable definition of at least one other conduit rule, the other conduit rule comprising instructions for processing electronic bill payments, the instructions further being configured to utilize a barcode, the barcode comprising an algorithmic signature.

22. A message conduit hub system, the system comprising hardware and/or software components, the components being configured to operate conduit hub logic, the logic being configured to enable definition of at least one algorithmic conduit and to enable definition of at least one conduit rule for controlling the algorithmic conduit.

23. The system of claim 22, wherein the system is configured to enable definition of at least one other conduit rule identifying a source conduit communicator.

24. The system of claim 22, wherein the system is configured to receive at least one message, and to apply the conduit rule.

* * * * *